US006752498B2

(12) United States Patent
Covannon et al.

(10) Patent No.: US 6,752,498 B2
(45) Date of Patent: Jun. 22, 2004

(54) ADAPTIVE AUTOSTEREOSCOPIC DISPLAY SYSTEM

(75) Inventors: Edward Covannon, Ontario, NY (US); John A. Agostinelli, Rochester, NY (US); Joshua M. Cobb, Victor, NY (US); Michael E. Miller, Rochester, NY (US); David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 493 days.

(21) Appl. No.: 09/854,699

(22) Filed: May 14, 2001

(65) Prior Publication Data

US 2002/0186348 A1 Dec. 12, 2002

(51) Int. Cl.[7] .................................. A61B 3/02
(52) U.S. Cl. ................ 351/240; 351/211; 351/209; 348/51; 348/52; 463/32; 463/34
(58) Field of Search ................. 351/240, 211, 351/209, 221; 600/558; 359/462, 464; 348/51, 52, 55, 57, 45; 463/32, 34

(56) References Cited

U.S. PATENT DOCUMENTS

| 3,748,015 A | 7/1973 | Offner |
| 4,124,978 A | 11/1978 | Wagner |
| 4,331,390 A | 5/1982 | Shafer |

(List continued on next page.)

FOREIGN PATENT DOCUMENTS

| EP | 576106 A1 | 12/1993 |
| EP | 656 555 A1 | 6/1995 |
| EP | 350 957 B1 | 4/1996 |
| GB | 2337828 | 12/1999 |
| JP | 09066476 | 3/1997 |
| WO | 00/62850 | 10/2000 |

OTHER PUBLICATIONS

K. Talmi and J. Liu; "Eye and gaze tracking for visually controlled interactive stereoscopic displays"; Signal Processing: Image Communication 14 (1999) pp. 799–810.

D. Runde; "How to Realize a Natural Image Reproduction using Stereoscopic Displays with Motion Parallax"; IEEE Transactions on Circuits and Systems for Video Technology, vol. 10, No. 3, Apr. 2000, pp. 376–386.

K. Hopf; "An Autostereoscopic Display Providing Comfortable Viewing Conditions and a High Degree of Telepresence"; IEEE Transactions on Circuits for Video Technology, vol. 10, No. 3, Apr. 2000, pp. 359–365.

G.J. Kintz; Autostereoscopic Properties of Spherical Panoramic Virtual Displays; SID 99 Digest; 1999, pp. 1000–1003.

(List continued on next page.)

*Primary Examiner*—Henry Bennett
*Assistant Examiner*—Fadi H. Dahbour
(74) *Attorney, Agent, or Firm*—Nelson Adrian Blish

(57) ABSTRACT

An autostereoscopic image display apparatus (10) that adapts to sensed feedback data about an observer (12) in order to conform its operation to adapt to the position and intraocular dimensions of the observer. The apparatus (10) uses ball lens projection optics to provide wide field-of-view pupil imaging, providing separate left- and right-eye images to the left and right eye pupils (14*l*,14*r*) of the observer (12), respectively. The apparatus (10) compensates for positional variables such as variable interocular distance and variable observer distance from projection optics. At least one observer feedback sensor (52) is disposed to provide feedback data about the observer (12). The feedback data can be used by a control logic processor (50) that, based on the data, adjusts left- and right viewing pupil forming apparatus (36*l*,36*r*). The control logic processor (50), based on sensed feedback data, may also vary image content or provide other stimuli such as smell, movement, and sound.

109 Claims, 15 Drawing Sheets

U.S. PATENT DOCUMENTS

| | | | |
|---|---|---|---|
| 4,623,233 A | | 11/1986 | Yamada et al. |
| 4,799,763 A | | 1/1989 | Davis et al. |
| 4,854,688 A | | 8/1989 | Hayford et al. |
| 5,206,499 A | | 4/1993 | Mantravadi et al. |
| 5,255,028 A | | 10/1993 | Biles |
| 5,319,968 A | | 6/1994 | Billing-Ross et al. |
| 5,568,314 A | * | 10/1996 | Omori et al. ............... 359/464 |
| 5,572,229 A | | 11/1996 | Fisher |
| 5,625,372 A | | 4/1997 | Hildebrand et al. |
| 5,644,427 A | * | 7/1997 | Omori et al. ............... 359/464 |
| 5,669,818 A | | 9/1997 | Thorner et al. |
| 5,671,992 A | | 9/1997 | Richards |
| 5,712,732 A | | 1/1998 | Street |
| 5,774,175 A | * | 6/1998 | Hattori ........................ 348/55 |
| 5,774,261 A | * | 6/1998 | Omori et al. ............... 359/464 |
| 5,777,720 A | | 7/1998 | Shapiro et al. |
| 5,793,341 A | * | 8/1998 | Omori et al. ................. 348/51 |
| 5,818,399 A | * | 10/1998 | Omori et al. ............... 359/462 |
| 5,908,300 A | | 6/1999 | Walker et al. |
| 5,940,564 A | | 8/1999 | Jewell |
| 5,976,017 A | | 11/1999 | Omori et al. |
| 6,011,580 A | * | 1/2000 | Hattori et al. ................ 348/57 |
| 6,011,581 A | | 1/2000 | Swift et al. |
| 6,034,717 A | | 3/2000 | Dentinger et al. |
| 6,055,013 A | | 4/2000 | Woodgate et al. |
| 6,069,649 A | | 5/2000 | Hattori |
| 6,075,557 A | | 6/2000 | Holliman et al. |
| 6,115,058 A | * | 9/2000 | Omori et al. ................. 348/45 |
| 6,148,280 A | | 11/2000 | Kramer |
| 6,162,191 A | | 12/2000 | Foxlin |
| 6,163,336 A | | 12/2000 | Richards |
| 6,445,366 B1 | * | 9/2002 | Hattori ........................ 348/55 |

OTHER PUBLICATIONS

S.A. Benton, T.E. Slowe, A.B. Kropp, and S.L. Smith; Micropolarizer–Based Multiple–Viewer Autostereoscopic Display; Stereoscopic Displays and Virtual Reality Systems VI, SPIE, vol. 3639, Jan. 1999, pp. 1–8.

Stuart McKay, Gordon Mair, Steven Mason, and Kenneth Revie; Membrane Mirror Based Autostereoscopic Display for Tele–Operation and Telepresence Applications; Stereoscopic Displays and Virtual Reality Systems VII, Proceedings of SPIE, vol. 3957, Jan. 2000, pp. 198–207.

Warren J. Smith; Modern Optical Engineering, The Design of Optical Systems; McGraw–Hill Book Company, 1966, pp. 42–45.

* cited by examiner

ADAPTIVE AUTOSTEREOSCOPIC DISPLAY SYSTEM

CROSS REFERENCE TO RELATED APPLICATIONS

Reference is made to commonly-assigned copending U.S. patent application Ser. No. 09/738,747, filed Dec. 15, 2000, entitled A MONOCENTRIC AUTOSTEREOSCOPIC OPTICAL APPARATUS AND METHOD, by Kessler et al.; U.S. patent application Ser. No. 09/766,899, filed Jan. 22, 2001, entitled AN IMAGE DISPLAY SYSTEM WITH BODY POSITION COMPENSATION, by Cok et al., the disclosures of which are incorporated herein.

FIELD OF THE INVENTION

This invention generally relates to autostereoscopic display systems for viewing images and more particularly relates to an apparatus and method for providing autostereoscopic viewing that is capable of adapting to viewer characteristics and response.

BACKGROUND OF THE INVENTION

The potential value of autostereoscopic display systems is widely appreciated particularly in entertainment and simulation fields. Autostereoscopic display systems include "immersion" systems, intended to provide a realistic viewing experience for an observer by visually surrounding the observer with a 3-D image having a very wide field of view. As differentiated from the larger group of stereoscopic displays that include it, the autostereoscopic display is characterized by the absence of any requirement for a wearable item of any type, such as goggles, headgear, or special glasses, for example. That is, an autostereoscopic display attempts to provide "natural" viewing conditions for an observer. An acknowledged design goal for immersion systems is to provide the most realistic viewing environment possible. While this relates most pronouncedly to visual perception, it can also encompass auditory, tactile, and other sensory perception as well.

In an article in *SID 99 Digest*, "Autostereoscopic Properties of Spherical Panoramic Virtual Displays", G. J. Kintz discloses one approach to providing autostereoscopic display with a wide field of view. Using the Kintz approach, no glasses or headgear are required. However, the observer's head must be positioned within a rapidly rotating spherical shell having arrays of LED emitters, imaged by a monocentric mirror, to form a collimated virtual image. While the Kintz design provides one solution for a truly autostereoscopic system having a wide field of view, this design has considerable drawbacks. Among the disadvantages of the Kintz design is the requirement that the observer's head be in close proximity to a rapidly spinning surface. Such an approach requires measures to minimize the likelihood of accident and injury from contact with components on the spinning surface. Even with protective shielding, proximity to a rapidly moving surface could, at the least, cause the observer some apprehension. In addition, use of such a system imposes considerable constraints on head movement, which compromises the illusion of natural reality that is a goal.

One class of autostereoscopic systems operates by imaging the exit pupils of a pair of projectors onto the eyes of an observer, is as outlined in an article by S. A. Bentone, T. E. Slowe, A. B. Kropp, and S. L. Smith ("Micropolarizer-based multiple-viewer autostereoscopic display," in *Stereoscopic Displays and Virtual Reality Systems VI*, SPIE, January, 1999). Pupil imaging, as outlined by Benton, can be implemented using large lenses or mirrors. An observer whose eyes are coincident with the imaged pupils can view a stereoscopic scene without crosstalk, without wearing eyewear of any kind.

It can be readily appreciated that the value and realistic quality of the viewing experience provided by an autostereoscopic display system using pupil imaging is enhanced by presenting the 3-D image with a wide field of view and large exit pupil. Such a system is most effective for immersive viewing functions if it allows an observer to be comfortably seated, without constraining head movement to within a tight tolerance and without requiring the observer to wear goggles or other device. For fully satisfactory 3-D viewing, such a system should provide separate, high-resolution images to right and left eyes. It can also be readily appreciated that such a system is most favorably designed for compactness, to create an illusion of depth and width of field, while occupying as little actual floor space and volume as is possible.

It is also known that conflict between depth cues associated with vergence and accommodation can adversely impact the viewing experience. Vergence refers to the degree at which the observer's eyes must be crossed in order to fuse the separate images of an object within the field of view. Vergence decreases, then vanishes as viewed objects become more distant. Accommodation refers to the requirement that the eye lens of the observer change shape to maintain retinal focus for the object of interest. It is known that there can be a temporary degradation of the observer's depth perception when the observer is exposed for a period of time to mismatched depth cues for vergence and accommodation. It is also known that this negative effect on depth perception can be mitigated when the accommodation cues correspond to distant image position.

An example of a conventional autostereoscopic display unit is disclosed in U.S. Pat. No. 5,671,992 (Richards), at which a seated observer experiences apparent 3-D visual effects created using images generated from separate projectors, one for each eye, and directed to the observer using an imaging system comprising a number of flat mirrors.

Conventional solutions for stereoscopic imaging have addressed some of the challenges noted above, but there is room for improvement. For example, some early stereoscopic systems employed special headwear, goggles, or eyeglasses to provide the 3-D viewing experience. As just one example of such a system, U.S. Pat. No. 6,034,717 (Denting et al.) discloses a projection display system requiring an observer to wear a set of passive polarizing glasses in order to selectively direct the appropriate image to each eye for creating a 3-D effect.

Certainly, there are some situations for which headgear of some kind can be considered appropriate for stereoscopic viewing, such as with simulation applications. For such an application, U.S. Pat. No. 5,572,229 (Fisher) discloses a projection display headgear that provides stereoscopic viewing with a wide field of view. However, where possible, there are advantages to providing autostereoscopic viewing, in which an observer is not required to wear any type of device, as was disclosed in the device of U.S. Pat. No. 5,671,992. It would also be advantageous to allow some degree of freedom for head movement. In contrast, U.S. Pat. No. 5,908,300 (Walker et al.) discloses a hang-gliding simulation system in which an observer's head is maintained in a fixed position. While such a solution may be tolerable in the limited simulation environment disclosed in the Walker et al. patent, and may simplify the overall optical design of an apparatus, constraint of head movement would be a disadvantage in an immersion system. Notably, the system disclosed in the Walker et al. patent employs a narrow viewing aperture, effectively limiting the field of view. Complex, conventional projection lenses, disposed in an off-axis orientation, are employed in the device disclosed in U.S. Pat. No. 5,908,300, with scaling used to obtain the desired output pupil size.

A number of systems have been developed to provide visual depth effects by presenting to the observer the combined image, through a beamsplitter, of two screens at two different distances from the observer, thereby creating the illusion of stereoscopic imaging, as is disclosed in U.S. Pat. No. 5,255,028 (Biles). However, this type of system is limited to small viewing angles and is, therefore, not suitable for providing an immersive viewing experience. In addition, images displayed using such a system are real images, presented at close proximity to the observer, and thus likely to introduce the vergence/accommodation problems noted above.

It is generally recognized that, in order to minimize vergence/accommodation effects, a 3-D viewing system should display its pair of stereoscopic images, whether real or virtual, at a relatively large distance from the observer. For real images, this means that a large display screen must be employed, preferably placed a good distance from the observer. For virtual images, however, a relatively small curved mirror can be used as is disclosed in U.S. Pat. No. 5,908,300 (Walker). The curved mirror acts as a collimator, providing a virtual image at a large distance from the observer. Another system for stereoscopic imaging is disclosed in "Membrane Mirror Based Autostereoscopic Display for Tele-Operation and Telepresence Applications," in Stereoscopic Displays and Virtual Reality Systems VII, Proceedings of SPIE, Volume 3957 (McKay, Mair, Mason, Revie) which uses a stretchable membrane mirror. However, the apparatus disclosed in the McKay article has limited field of view, due to the use of conventional projection optics and due to dimensional constraints that limit membrane mirror curvature.

Curved mirrors have also been used to provide real images in stereoscopic systems, where the curved mirrors are not used as collimators. Such systems are disclosed in U.S. Pat. Nos. 4,623,223 (Kempf); and 4,799,763 (Davis et al.) for example. However, systems such as these are generally suitable where only a small field of view is needed.

Notably, existing solutions for stereoscopic projection, such as the system disclosed in U.S. Pat. No. 5,671,992 noted above, project images as real images. However, presentation of a real image has inherent drawbacks for stereoscopic viewing. In a real image display, the image viewed by an observer is formed on or projected onto a display surface. The dimensions of this display surface necessarily limit the field of the projected image. This is true even where the image is then projected on a curved surface. This can result in undesirable distortion and other image aberration, not only constraining field of view, but also limiting image quality overall. Screen artifacts can further degrade image quality in a displayed real image.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages, as is outlined in U.S. Pat. No. 5,625,372 (Hildebrand et al.) As one significant advantage for stereoscopic viewing, the size of a virtual image is not limited by the size or location of a display surface. Additionally, the source object for a virtual image may be small; a magnifying glass, as a simple example, provides a virtual image of its object. Thus, it can be seen that, in comparison with prior art systems that project a real image, a more realistic viewing experience can be provided by forming a virtual image that is disposed to appear some distance away. Providing a virtual image also obviates any need to compensate for screen artifacts, as may be necessary when projecting a real image.

From an optical perspective, it can be seen that there are advantages to autostereoscopic design using pupil imaging. A system designed for pupil imaging must provide separate images, as a stereoscopic pair, to the left and right pupils correspondingly, and must provide natural viewing conditions without goggles or special headgear. In addition, it would be advantageous for such a system to provide the largest possible pupils to the observer, so as to allow some freedom of movement, and to provide an ultra-wide field of view. It is recognized in the optical arts that any single one of these requirements, taken by itself, can be difficult to achieve. An ideal autostereoscopic imaging system must meet the challenge for both requirements in order to provide a more fully satisfactory and realistic viewing experience. In addition, such a system must provide sufficient resolution for realistic imaging, with high brightness and contrast. Moreover, the requirement that equipment have a small footprint imposes physical constraints on system design. There are also dimensional constraints for interocular separation, so that separate images directed to each eye can be precisely spaced and correctly separated for viewing. It is instructive to note that, using conventional lens design techniques, interocular distance constraints limit the ability to achieve larger pupil diameter at a given ultrawide field by simply scaling the projection lens.

Monocentric imaging systems have been shown to provide significant advantages for high-resolution imaging of flat objects, such as is disclosed in U.S. Pat. No. 3,748,015 (Offner), which teaches an arrangement of spherical mirrors arranged with coincident centers of curvature in an imaging system designed for unit magnification. The monocentric arrangement disclosed in the Offner patent minimizes a number of types of image aberration and is conceptually straightforward, allowing a simplified optical design for high-resolution catoptric imaging systems. A monocentric arrangement of mirrors and lenses is also known to provide advantages for telescopic systems having wide field of view, as is disclosed in U.S. Pat. No. 4,331,390 (Shafer). However, while the advantages of monocentric design for overall simplicity and for minimizing distortion and optical aberrations can be appreciated, such a design concept can be difficult to implement in an immersion system requiring wide field of view and large exit pupil with a reasonably small overall footprint. Moreover, a fully monocentric design would not meet the requirement for full stereoscopic imaging, requiring separate images for left and right pupils.

As is disclosed in U.S. Pat. No. 5,908,300, conventional wide-field projection lenses can be employed as projection lenses in a pupil-imaging autostereoscopic display. However, there are a number of disadvantages with conventional approaches for pupil imaging optics. Wide-angle lens systems, capable of angular fields such as would be needed for effective immersion viewing, would be very complex and costly. Typical wide angle lenses for large-format cameras, such as the Biogon™ lens manufactured by Carl-Zeiss-Stiftung in Jena, Germany for example, are capable of 75-degree angular fields. The Biogon lens consists of seven component lenses and is more than 80 mm in diameter, while only providing a pupil size of 10 mm. For larger pupil size, the lens needs to be scaled in size; however, the large diameter of such a lens body presents a significant design difficulty for an autostereoscopic immersion system, relative to the interocular distance at the viewing position. Costly cutting of lenses so that right- and left-eye assemblies could be disposed side-by-side, thereby achieving a pair of lens pupils spaced consistent with human interocular separation, presents difficult manufacturing problems. Interocular distance limitations constrain the spatial positioning of projection apparatus for each eye and preclude scaling of pupil size by simple scaling of the lens. Moreover, an effective immersion system most advantageously allows a very wide field of view, preferably well in excess of 90 degrees, and would provide large exit pupil diameters, preferably larger than 20 mm.

As an alternative for large field of view applications, ball lenses have been employed for specialized optical functions, particularly miniaturized ball lenses for use in fiber optics coupling and transmission applications, such as is disclosed in U.S. Pat. No. 5,940,564 (Jewell) which discloses advantageous use of a miniature ball lens within a coupling device. On a larger scale, ball lenses can be utilized within an astronomical tracking device, as is disclosed in U.S. Pat. No. 5,206,499 (Mantravadi et al.) In the Mantravadi et al. patent, the ball lens is employed because it allows a wide field of view, greater than 60 degrees, with minimal off-axis aberrations or distortions. In particular, the absence of a unique optical axis is used advantageously, so that every principal ray that passes through the ball lens can be considered to define its own optical axis. Because of its low illumination falloff relative to angular changes of incident light, a single ball lens is favorably used to direct light from space to a plurality of sensors in this application. Notably, photosensors at the output of the ball lens are disposed along a curved focal plane.

The benefits of a spherical or ball lens for wide angle imaging are also utilized in an apparatus for determining space-craft attitude, as is disclosed in U.S. Pat. No. 5,319,968 (Billing-Ross et al.) Here, an array of mirrors direct light rays through a ball lens. The shape of this lens is advantageous since beams which pass through the lens are at normal incidence to the image surface. The light rays are thus refracted toward the center of the lens, resulting in an imaging system having a wide field of view. Another specialized use of ball lens characteristics is disclosed in U.S. Pat. No. 4,854,688 (Hayford et al.) in the optical arrangement of the Hayford et al. patent, directed to the transmission of a 2-dimensional image along a non-linear path, such as attached to headgear for a pilot, a ball lens directs a collimated input image, optically at infinity, for a pilot's view.

Another use for wide-angle viewing capabilities of a ball lens is disclosed in U.S. Pat. No. 4,124,978 (Thompson), which teaches use of a ball lens as part of an objective lens in binocular optics for night viewing.

With each of the patents described above that disclose use of a ball lens, there are suggestions of the overall capability of the ball lens to provide, in conjunction with support optics, wide field of view imaging. However, there are substantial problems that must be overcome in order to make effective use of such devices for immersive imaging applications, particularly where an electronically processed image is projected. Conventional electronic image presentation techniques, using devices such as spatial light modulators, provide an image on a flat surface. Ball lens performance with flat field imaging would be extremely poor.

There are also other basic optical limitations for immersion systems that must be addressed with any type of optical projection that provides a wide field of view. An important limitation is imposed by the Lagrange invariant. Any imaging system conforms to the Lagrange invariant, whereby the product of pupil size and semi-field angle is equal to the product of the image size and the numerical aperture and is an invariant for the optical system. This can be a limitation when using, as an image generator, a relatively small spatial light modulator or similar pixel array which can operate over a relatively small numerical aperture since the Lagrange value associated with the device is small. A monocentric imaging system, however, providing a large field of view with a large pupil size (that is, a large numerical aperture), inherently has a large Lagrange value. Thus, when this monocentric imaging system is used with a spatial light modulator having a small Lagrange value, either the field or the aperture of the imaging system, or both, will be underfilled due to such a mismatch of Lagrange values. For a detailed description of the Lagrange invariant, reference is made to *Modern Optical Engineering, The Design of Optical Systems* by Warren J. Smith, published by McGraw-Hill, Inc., pages 42–45.

For the purpose of more accurately providing stereoscopic imaging, where the image intended for the left eye differs at least slightly from the image for the right eye, a number of conventional stereoscopic imaging systems utilize head tracking. Head tracking allows a stereoscopic imaging system to adjust display behavior based on sensed data such as the distance of an observer from the display, head orientation, and similar factors.

As is noted in U.S. Pat. No. 6,162,191 (Foxlin), there are four basic types of head tracking technologies, namely optical, mechanical, ultrasonic, and magnetic. With respect to conventional stereoscopic display systems, optical head tracking methods are most widely used. As one example, U.S. Pat. No. 6,011,581 (Swift et al.) discloses use of miniature cameras for eye and head imaging, coupled to an orientation computing subsystem that analyzes images of the observer in order to compute head distance and angle. Other examples of head tracking for stereoscopic display systems include the following:

U.S. Pat. No. 6,163,336 (Richards) discloses a head tracking system for stereoscopic viewing that further provides eye-tracking in 3 dimensions, using infrared light and reflection techniques.

U.S. Pat. No. 6,075,557 (Holliman et al.) discloses a head tracking system used to adjust viewing windows for an observer who may be located at one of a number of different positions.

U.S. Pat. No. 6,055,013 (Woodgate et al.) discloses a system that provides discrete viewing zones for proper 3-D display.

European Pat. Application 0 576 106 A1 (Eichenlaub) discloses observer head tracking for a stereoscopic system using a screen display.

U.S. Pat. No. 5,777,720 (Shapiro et al.) discloses observer tracking and a method of calibration for increasing tracking accuracy. Notably, the Shapiro et al. patent also discloses a method of sensing interocular distance, which can vary between one observer and another.

European Pat. Application 0 656 555 A1 (Woodgate et al.) discloses a stereoscopic imaging display with head tracking in three dimensions and with interocular distance sensing. The Woodgate et al. application also discloses methods for tracking and interocular compensation in a stereoscopic display apparatus.

European Pat. Application 0 350 957 (Tomono et al.) discloses an eye tracking method that detects reflected light from a viewer's face at two different wavelengths to determine the position of pupils and gaze direction.

U.S. Pat. No. 6,069,649 (Hattori) discloses head tracking and compensation in a system using a time-interlaced display screen.

The capability for accurate head tracking, as is disclosed in the above patents, enables a stereoscopic imaging system to suitably adapt image presentation and focus to suit sensed attributes including observer distance, interocular distance, observer gaze point, posture, gesture, and the like. However, although conventional stereoscopic imaging systems can detect head distance, interocular distance, and other features related to stereoscopic imaging, these systems are constrained with respect to their ability to respond to these sensed attributes. For example, even though a system such as that disclosed in U.S. Pat. No. 5,777,720 is able to detect interocular dimension differences between one observer and the next, such a system is limited in its capability to compensate for such variation.

For real images, as provided by the stereoscopic displays in patents cited above, compensation for horizontal distance changes is performed by varying the width and placement of vertical segments of a projected display in some fashion. Compensation for head distance from the display can be compensated by adjusting the tilt angle of a screen or light source, or by moving individual right-eye and left-eye projection apparatus or other optical component. Moreover, the methods described in each of the patents listed above may work acceptably for types of stereoscopic systems that project a real image. However, the conventional methods described for such systems would be awkward and difficult to adapt to a system that provides a virtual image using pupil imaging. Thus it can be seen that there is a need for a suitable head tracking and response mechanism in an autostereoscopic display apparatus that utilizes ball lenses and takes advantage of the benefits of an optically monocentric design.

A related application for head tracking and compensation in an autostereoscopic viewing system is commonly assigned application "An Image Display System with Body Position Compensation" Ser. No. 09/766,899, filed Jan. 22, 2001, in the names of Ronald S. Cok and Mark E. Bridges. This application discloses a chair designed to compensate for viewer head movement in order to maintain proper pupil position. As is noted in this application, compensation by chair movement may be optimal for an initial coarse positioning of an observer. Then, where there are subsequent subtle changes in head movement, it may be more efficient and faster to adjust the position of system optics rather than to reposition a chair. Thus, a combination of controlled movements may be needed to achieve optimal response compensation for positioning of view pupils in an autostereoscopic imaging system.

It is well known to those skilled in the virtual reality art that, while the visual display is the primary component needed for an effective immersion experience, there is substantial added value in complementing visual accuracy with reinforcement using other senses of an observer. While the addition of auditory, tactile, and motion stimuli has been implemented for a more realistic and compelling motion picture experience to an audience, there is a need to provide additional sense stimuli in an autostereoscopic viewing system. Moreover, the use of such additional stimuli may be optimized using sensed feedback information about an observer. Thus it can be seen that, while there are some conventional approaches that meet some of the requirements for stereoscopic imaging, there is a need for an improved autostereoscopic imaging solution for viewing electronically generated images, where the solution provides a structurally simple apparatus, minimizes aberrations and image distortion, and meets demanding requirements for providing wide field of view with large pupil size, for compensating for observer head movement and interocular distance differences, and for providing additional sensory stimulation.

SUMMARY OF THE INVENTION

It is an object of the present invention to provide an autostereoscopic image display apparatus capable of modifying the spatial position of a left eye viewing pupil and a right eye viewing pupil in response to feedback data about an observer, said display apparatus comprising:

(a) an adaptive autostereoscopic image delivery system comprising:
  (1) an image generator for generating, from an image source, a left eye image and a right eye image;
  (2) a control logic processor for of accepting feedback data about said observer and providing a command in response to said feedback data;
  (3) a left viewing pupil forming apparatus for providing said left eye image, as a virtual image, to said left viewing pupil for viewing by said observer;
  (4) a right viewing pupil forming apparatus for providing said right eye image, as a virtual image, to said right viewing pupil for viewing by said observer,
  wherein said left viewing pupil forming apparatus and said right viewing pupil forming apparatus adjust the position of the left viewing pupil and right viewing pupil respectively, based on said command from said control logic processor;

(b) at least one observer feedback sensor for providing said feedback data to said control logic processor.

In an alternate embodiment, the present invention provides left-eye and right-eye images as real images, projected onto a substantially retroreflective screen.

A feature of the present invention is the use of a monocentric arrangement of optical components, thus simplifying design, minimizing aberrations and providing a wide field of view with large exit pupils.

A further feature of the present invention is the use of ball lenses in the left-eye and right-eye projection apparatus, wherein the ball lenses are used to project an image having a wide field of view.

An additional of the present invention is a head-tracking subsystem disposed within a feedback loop in order to respond to sensed position of the observer's head.

It is an advantage of the present invention that it provides an autostereoscopic display system capable of adapting to variation in observer positioning and movement. In addition, the present invention also adapts to differences in interocular distance, conditioning the display for optimum viewing by each individual observer.

It is a further advantage of the present invention that it allows viewing of a stereoscopic display with pupil imaging, providing a natural, three-dimensional display without requiring wearing of a helmet, glasses, or other object.

It is an advantage of the present invention that it provides a system for wide field stereoscopic projection that is inexpensive when compared with the cost of conventional projection lens systems.

It is yet a further advantage of the present invention that it provides an exit pupil of sufficient size to allow for non-critical alignment of an observer in relation to the display.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
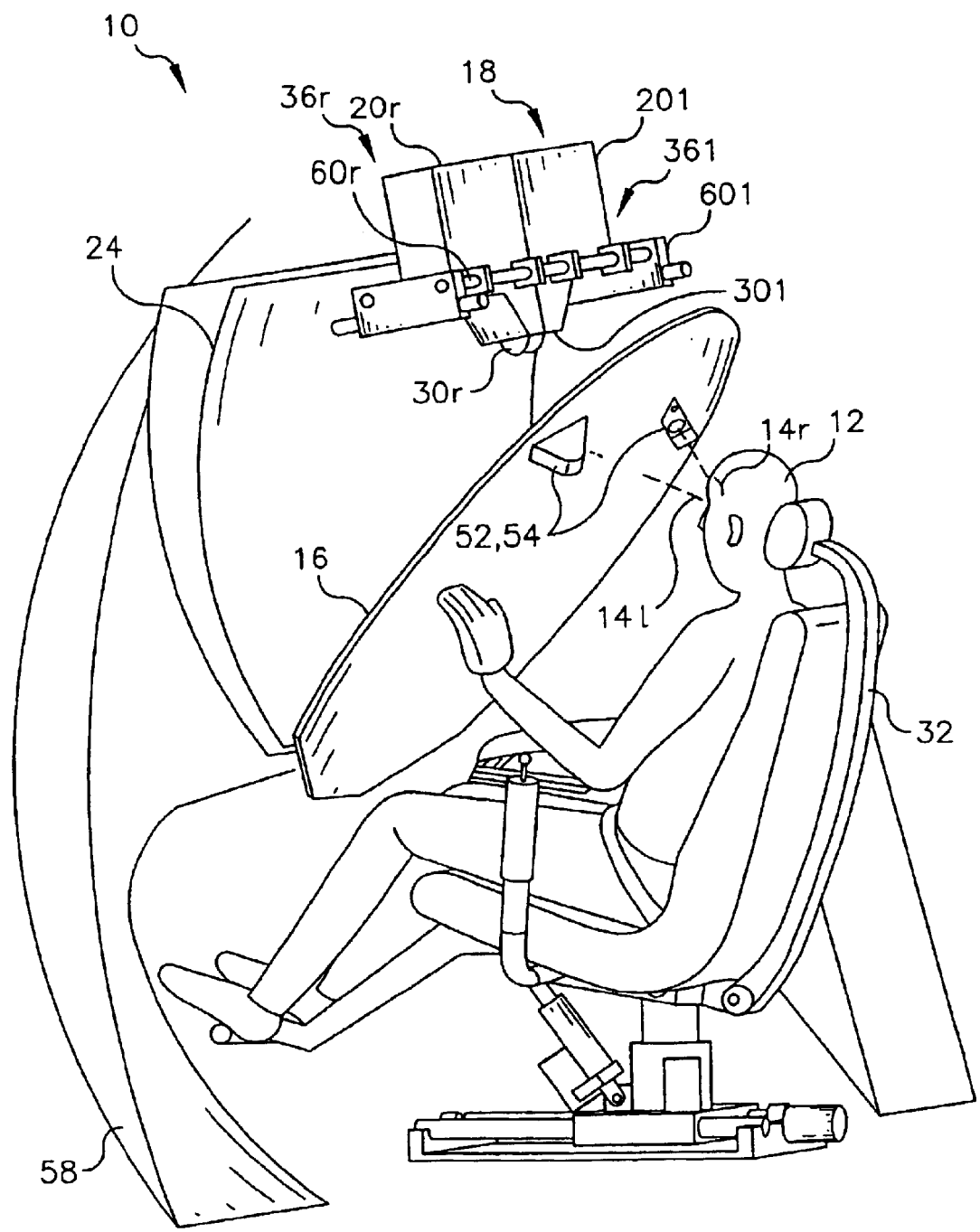
FIG. 1 is a perspective view of the adaptive autostereoscopic display system of the present invention.

Referring to FIG. 1, there is shown an adaptive autostereoscopic display system 10. An observer 12 is seated in an adjustable chair 32 for viewing an image projected by an autostereoscopic image delivery system 18 to a left viewing pupil 14*l* and to a right viewing pupil 14*r*. Image delivery system 18 comprises a left viewing pupil forming apparatus 36*l* for forming and positioning left viewing pupil 14*l* and a right viewing pupil forming apparatus 36*r* for forming and positioning right viewing pupil 14*r*. A housing 58 provides a structure for mounting the various components of autostereoscopic image delivery system 18 and related components.

Figure 2:
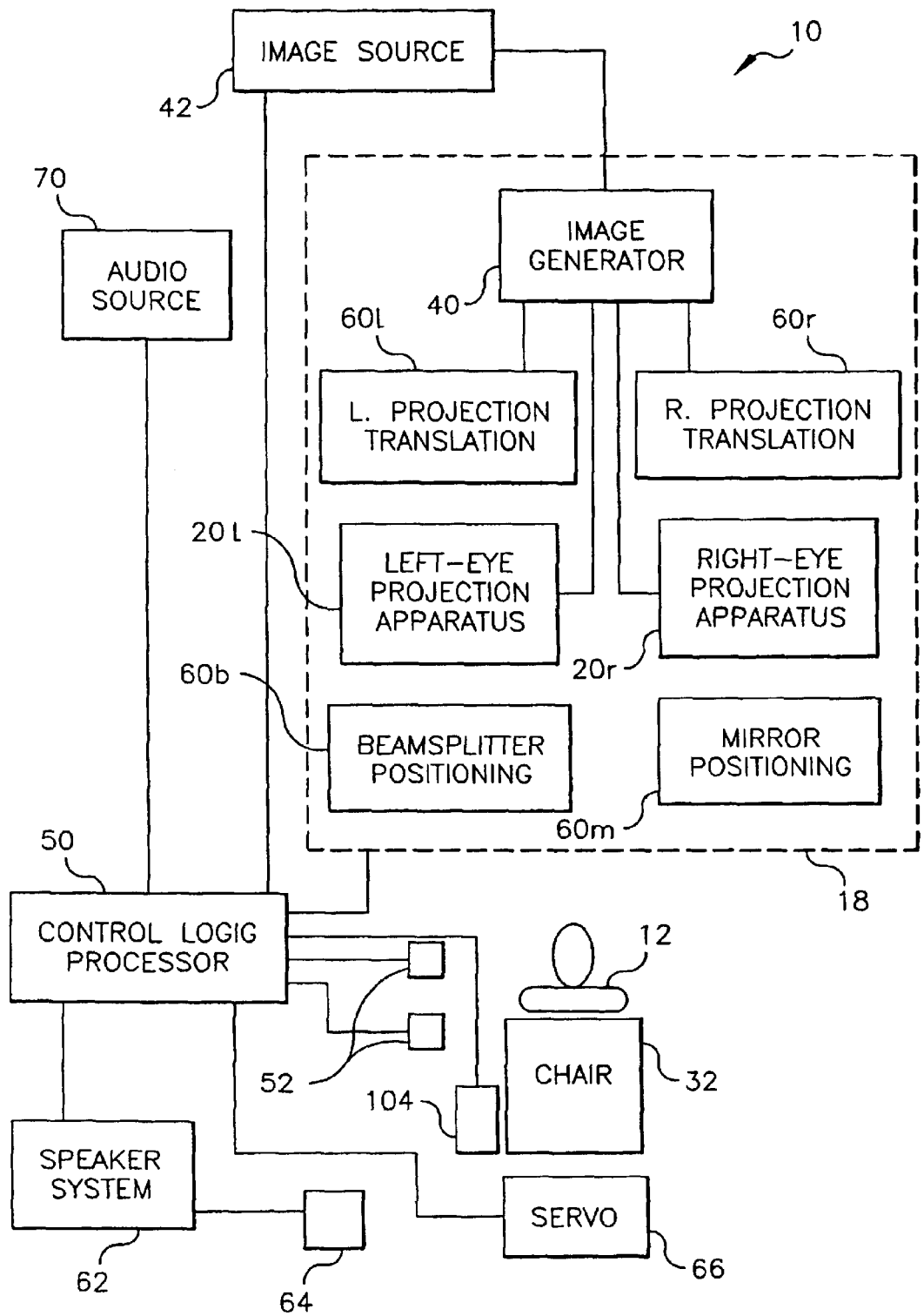
FIG. 2 is a block diagram showing the relationships of key components of the autostereoscopic display system.

Referring to FIG. 2, there is shown a block diagram of key control and signal paths for major components of adaptive autostereoscopic display system 10. An image source 42 provides image content to an image generator 40, part of image delivery system 18. Image generator 40, comprising a digital image conditioning device under the control of a control logic processor 50, then cooperates with left and right viewing pupil forming apparatus 36*l*/36*r* (which includes components shown in FIG. 2, but is shown more fully in FIG. 3b) to provide the left-eye image to a left-eye projection apparatus 20*l* and the right-eye image to a right-eye projection apparatus 20*r*.

Image source 42 may provide any of a number of types of images, such as, but not limited to, the following:

(a) Live images from cameras locally or remotely positioned.

(b) Images from film, such as conventional motion picture images.

(c) Images processed digitally, such as digital cinema images for example. This can include images stored on a storage medium, such as a computer hard disk or removable storage device, for example.

(d) Images generated digitally, such as computer simulations.

This can include images stored on a storage medium, such as a computer hard disk or removable storage device, for example.

From the description of FIGS. 1 and 2, it can be observed that similar optical components within autostereoscopic image delivery system 18 are used to present separate left and right images to each eye of observer 12. When the description that follows applies in general to either left- or right-components, appended "l" and "r" designators are omitted unless otherwise needed.

Referring again to FIG. 2, control logic processor 50 controls the operation of image generator 40, the position of projection apparatus 20, and the overall operation of projection translation and positioning apparatus 60 within autostereoscopic image delivery system 18. Control logic processor 50 may also control a chair servo mechanism 66 and can accept feedback data about observer 12 from observer feedback sensors 52 such as cameras 54. Control logic processor 50 may also control other optional output devices for controlling vibration, temperature, fans, or other devices as described below. Optional audio content from an audio source 70, also under control of control logic processor 50, can be directed to a speaker system 62 and to one or more speakers 64. Control logic processor 50 is a computer of some type, possibly comprising a dedicated CPU or microprocessor, programmed to generate output commands based on program instructions and conditioned by sensed input feedback data.

Optics Path

Referring to FIGS. 1, 2, 3a, and 3b, there are shown optical components of image delivery system 18 and of viewing pupil forming apparatus 36.

In a preferred embodiment, left viewing pupil forming apparatus 36l comprises an image forming device, a spatial light modulator 44 in the preferred embodiment, and comprises the following:

(1) a left-eye projection apparatus 20l, which includes a left ball lens assembly 30l, optionally having an associated left-eye projection translation apparatus 60l under control of control logic processor 50;

(2) a curved mirror 24, optionally having an associated mirror positioning apparatus 60m under control of control logic processor 50; and, (3) a beamsplitter 16, optionally having a beamsplitter positioning apparatus 60b under control of control logic processor 50.

Correspondingly, in a preferred embodiment, right viewing pupil forming apparatus 36r comprises an image forming device, spatial light modulator 44 in the preferred embodiment, and comprises the following:

(1) a right-eye projection apparatus 20r, which includes a right ball lens assembly 30r, optionally having an associated right-eye projection translation apparatus 60r under control of control logic processor 50;

(2) curved mirror 24, optionally having associated mirror positioning apparatus 60m under control of control logic processor 50; and, (3) beamsplitter 16, optionally having beamsplitter positioning apparatus 60b under control of control logic processor 50.

It should be noted that left and right viewing pupil forming apparatus 36l/36r need not include all of items (1)–(3) as listed above. In an alternate, simpler embodiment of the present invention, each viewing pupil forming apparatus 36 could simply comprise a projection apparatus 20 with its associated translation apparatus 60l/60r. Within the scope of the present invention, viewing pupil forming apparatus could comprise any one of items (1)–(3) with its associated translation component, or any combination of two of items (1)–(3) with their associated translation components.

Figure 3A:
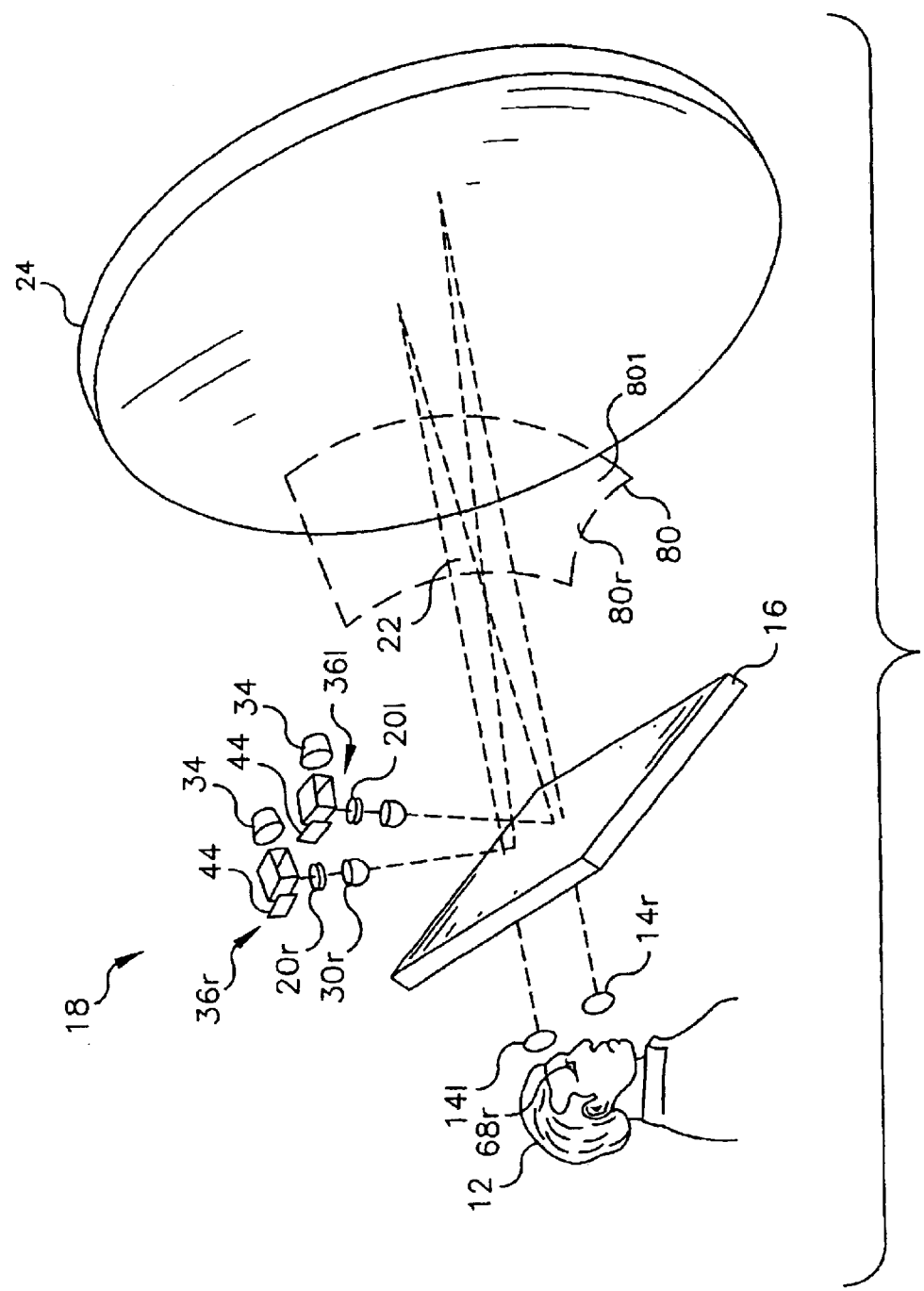
FIG. 3a is a block diagram view showing the optics path in a preferred embodiment of the adaptive autostereoscopic display system.
Figure 3B:
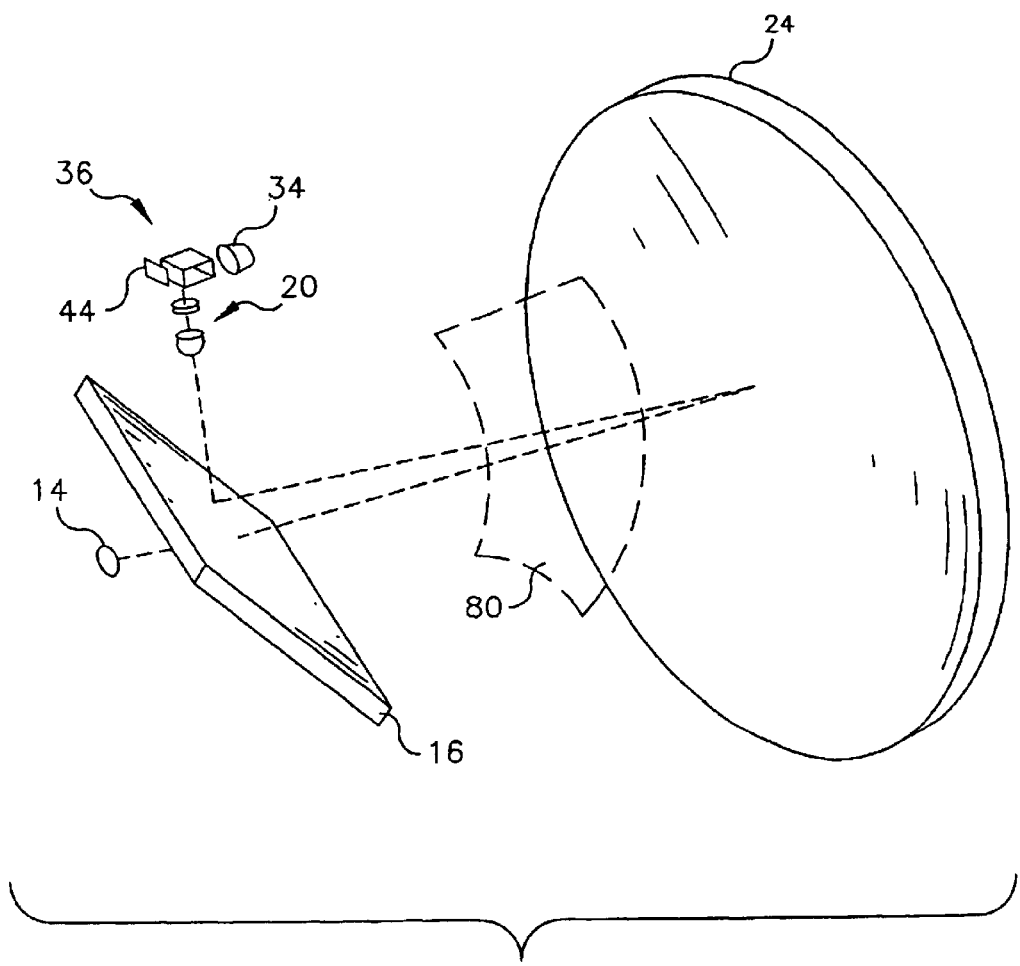
FIG. 3b is a block diagram view showing the optics path for one viewing pupil, identifying components that are part of a viewing pupil forming apparatus.

FIG. 3b shows the key optical components that constitute each viewing pupil forming apparatus 36 within autostereoscopic image delivery system 18 in a preferred embodiment. It must be emphasized that curved mirror 24 and beamsplitter 16 are common to both left and right viewing pupil forming apparatus 36l and 36r. For each viewing pupil forming apparatus 36, spatial light modulator 44 is controlled by image generator 40 (as shown in FIG. 2) to generate the appropriate left or right image of the stereoscopic image pair. Spatial light modulator 44 may comprise a device such as a liquid-crystal device (LCD), digital multimirror device (DMD), grating light valve (GLV) and the like. For each viewing pupil forming apparatus 36 in the preferred embodiment, a light source 34 is modulated by spatial light modulator 44 in order to generate the displayed image. Projection apparatus 20 directs the image toward beamsplitter 16. A curved image 80, an intermediate, real image, is thus formed between beamsplitter 16 and curved mirror 24. Curved mirror 24 then forms the virtual image that is visible from viewing pupil 14.

FIG. 3a shows how a stereoscopic image pair is formed using the interaction of optical components described above with reference to FIG. 3b. As FIG. 3a illustrates, a right curved image 80r, is formed as an intermediate, real image near a front focal surface 22 of curved mirror 24, so as to be located between right ball lens assembly 30r and curved mirror 24. Left-eye projection apparatus 20l works in similar fashion to form a corresponding intermediate left curved image 80l near front focal surface 22 of curved mirror 24.

Referring again to FIG. 3a, the stereoscopic image seen by observer 12 is formed from curved image 80 as a virtual image. That is, the image does not appear to observer 12 as if projected onto the surface of curved mirror 24, instead, the image appears to be behind curved mirror 24, controllably situated between the rear of curved mirror 24 and infinity. The stereoscopic image seen by observer 12 comprises a left image that is viewed from left viewing pupil 14l and a right image that is viewed from right viewing pupil 14r. As is represented in FIG. 3, the left and right optical paths cross in system 10, due to imaging by curved mirror 24.

Referring back to FIG. 1, observer 12 is typically seated in position in adjustable chair 32 to view a virtual stereoscopic image from left and right viewing pupils 14l and 14r. Referring again to FIG. 3a, optimal viewing conditions are obtained when left eye pupil 68l (not labeled in FIG. 3a) and right eye pupil 68r of observer 12 are substantially coincident with the position of left and right viewing pupils 14l and 14r.

Control Feedback Loop

With the above description of the interaction of optical components within autostereoscopic image delivery system 18 in mind, it is now instructive to disclose how both left and right viewing pupil forming apparatus 36l and 36r are configured so as to be adaptive, allowing adjustment of the position of left and right viewing pupils 14l and 14r.

Pupil imaging to provide a virtual image, as described with respect to FIGS. 3a and 3b above, provides an effective immersion experience, with a wide field of view, using a compact display device. However, in order to maintain pupil imaging, it is required that optics path components within left and right viewing pupil forming apparatus 36l and 36r be flexibly movable in order to adjust for an initial observer 12 head position (such as when observer 12 is first seated at system 10) and to compensate for changes in head positioning of observer 12. Having this capability for head movement adaptation allows adaptive autostereoscopic display system 10 to adjust viewing pupil 14 positions to adapt to head movement and thereby make the viewing experience more natural. Adaptive autostereoscopic display system 10 is also able to make subtle adjustments for forming right and left images in order to compensate for motion by observer 12.

The apparatus of the present invention allows a number of methods for repositioning viewing pupils 14l/14r to compensate for changes in head position by observer 12. These are chiefly the following, used singly or in combination:

(a) movement of one or both ball lens assemblies 30l/30r by movement of their associated projection apparatus 20l/20r;

(b) movement of beamsplitter 16;

(c) movement of curved mirror 24;

(d) movement of adjustable chair 32.

Figure 4:
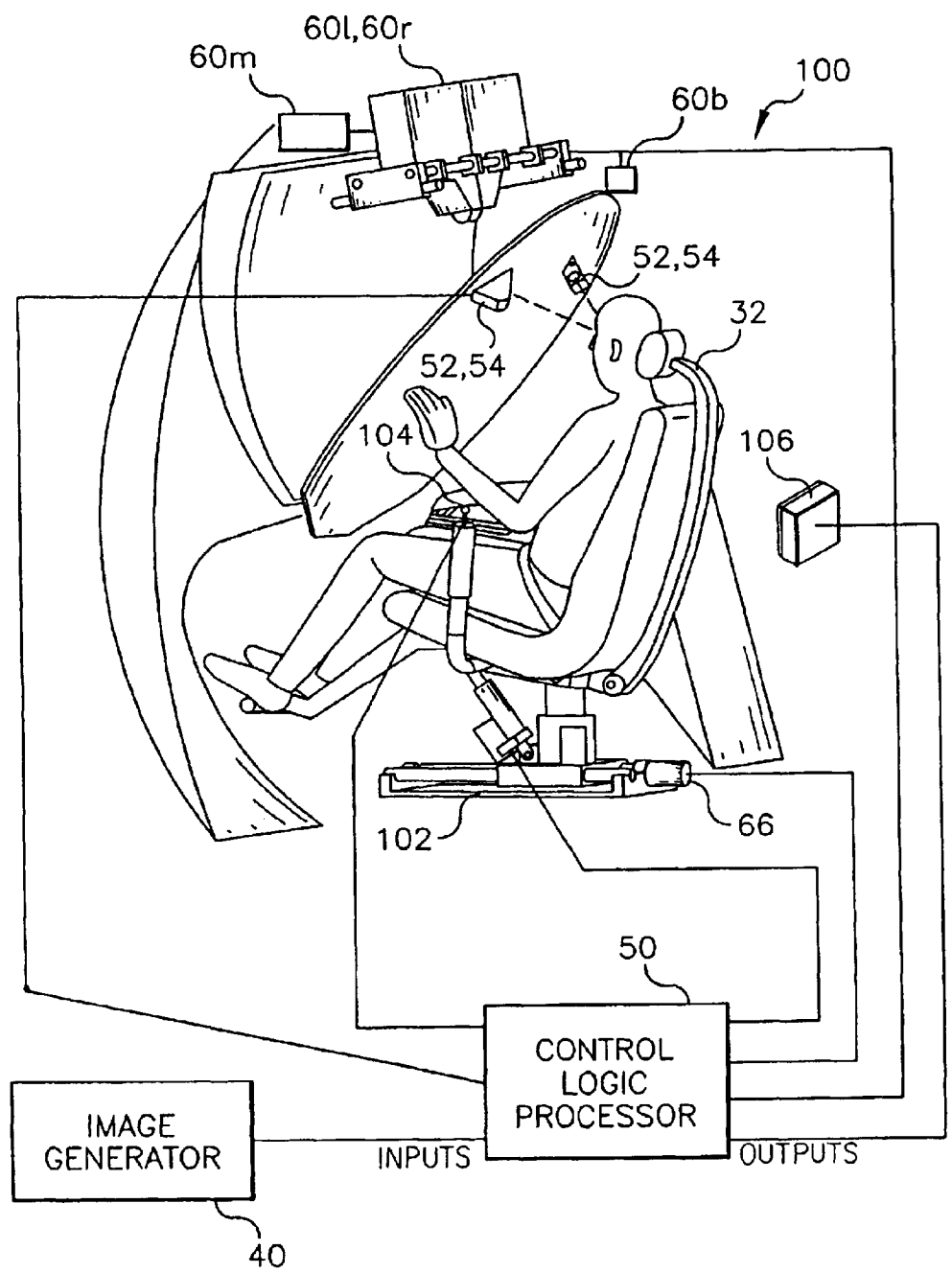
FIG. 4 is a perspective view showing key components of a control loop used for operator sensing, head tracking and compensation, and sensory output.

As was noted in the description of the optics path (FIG. 3a), the mechanisms listed immediately above in (a), (b), and (c) above are each part of viewing pupil forming apparatus 36*l* and 36*r*. Movement using any of the mechanisms (a)–(d) listed above is controlled within a control feedback loop 100, as shown in FIG. 4. It can also be possible to control the position and angular orientation of spatial light modulator 44 when necessary, as is described subsequently.

Referring to FIG. 4, inputs to control logic processor 50 within control feedback loop 100 include observer feedback sensors 52 such as cameras 54. One or more manual controls 104 such as a joystick, mouse, or other manipulable device may also be configured as observer feedback sensor 52.

Compensation for Head Movement of Observer 12

It is now instructive to disclose more specifically how outputs of the control loop of FIG. 4 can be controlled to move various optical components within left and right viewing pupil forming apparatus 36*l* and 36*r* of FIGS. 3*a* and 3*b* in order to effect adjustment in the positioning of left and right viewing pupils 14*l* and 14*r*.

In a preferred embodiment, controlled outputs from control logic processor 50 within control feedback loop 100 include projection translation apparatus 60*l*/60*r*, used to dynamically adjust the position of left ball lens assembly 30*l* and right ball lens assembly 30*r*, respectively, in order to compensate for detected changes in the position of human eye pupils 68*l* and 68*r* (not shown in FIG. 4) of observer 12. As is noted above, other controlled outputs used for dynamically adapting the optics path for maintaining correct viewing pupil 14 positioning include beamsplitter positioning apparatus 60*b* for controlling positioning and tilt of beamsplitter 16 and mirror positioning apparatus 60*m* for controlling positioning and tilt of curved mirror 24.

Figure 5:
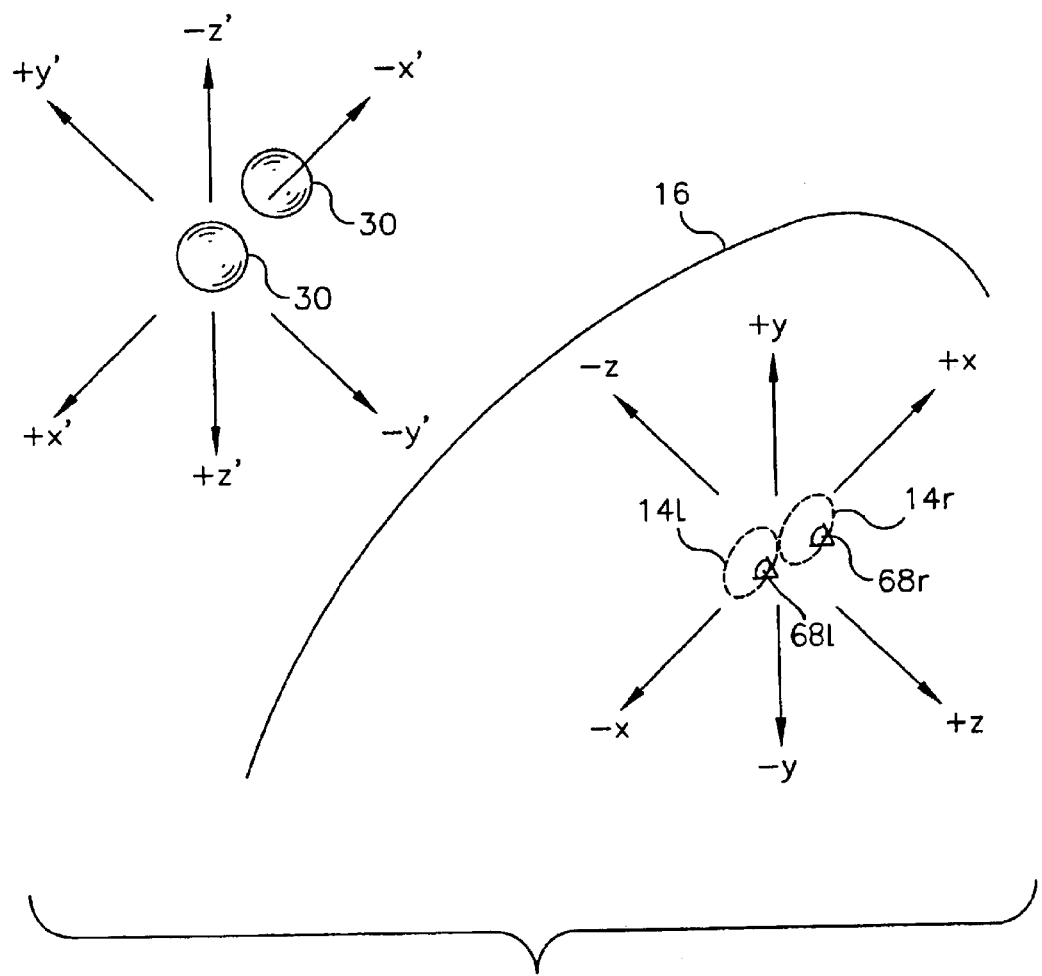
FIG. 5 is a perspective view showing coordinate mapping for the system, relative to observer head movement and shows how movement of ball lens assemblies within the projection apparatus can be used to compensate for an observer's head movement.

Referring to FIG. 5, there is shown the coordinate mapping arrangement used in the operation of control feedback loop 100 in order to adjust the position of each viewing pupil 14*l*/14*r* based on detected change in position of each human eye pupil 68*l*/68*r* of observer 12 when using left-eye projection translation apparatus 60*l* and right-eye projection translation apparatus 60*r* to control the positioning of ball lens assemblies 30*l*/30*r*. For each human eye pupil 68*l*/68*r*, moving within the x, y, and z coordinates shown, the corresponding projection apparatus 20*l*/20*r* moves ball lens assemblies 30*l*/30*r* within the x', y', and z' coordinates shown. Ball lens assembly 30, which acts as the output projection lens in a preferred embodiment, is then spatially repositioned for each human eye pupil 68 using the coordinate mapping shown.

For example, with reference to FIG. 5, consider movement of operator 12 in the +x direction. Without corresponding adjustment of viewing pupil 14*l*/14*r* position in the same +x direction, the human eye pupils 68*l*/68*r* of operator 12 may no longer be centered appropriately for stereoscopic viewing. To compensate for this movement, therefore, it is necessary for projection translation apparatus 60*l*/60*r* to move ball lens assemblies 30 in the +x' direction indicated in FIG. 5. For this coordinate, note that the corresponding +x' movement is opposite in direction relative to the +x movement of operator 12.

FIG. 5 also shows one advantage of unit magnification pupil imaging, as is used in the preferred embodiment. That is, the compensating +x' movement required of ball lens assembly 30 is equal in magnitude (although opposite in direction) to the +x movement distance.

In order to effect the movement changes shown in FIG. 5, projection translation apparatus 60*l*/60*r* must provide smooth movement of ball lens assembly 30 along each of the three axes shown (that is, x', y', and z' axes). There are a number of well known solutions for accurate three-axis motion that can be used within system 10 for translation apparatus 60*l*/60*r*, utilizing a variety of mechanical actuator devices such as lead screws, belts, or gears, for example.

Figure 6A:
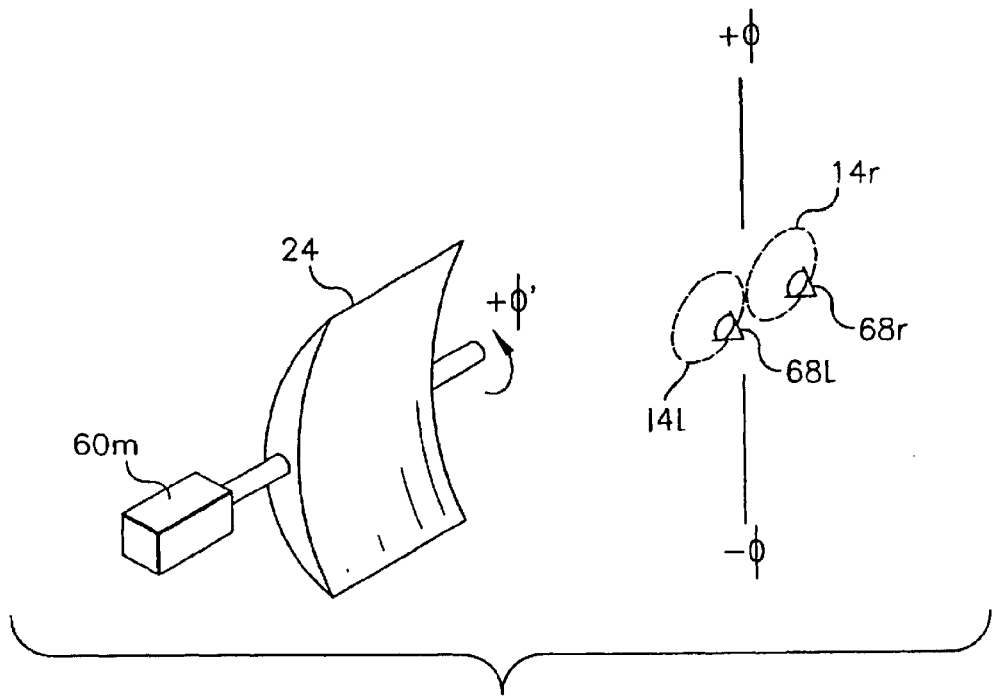
FIGS. 6a, 6b, and 6c are perspective views showing how movement of the curved mirror, along different alternative axes, can be used to compensate for an observer's head movement.
Figure 6B:
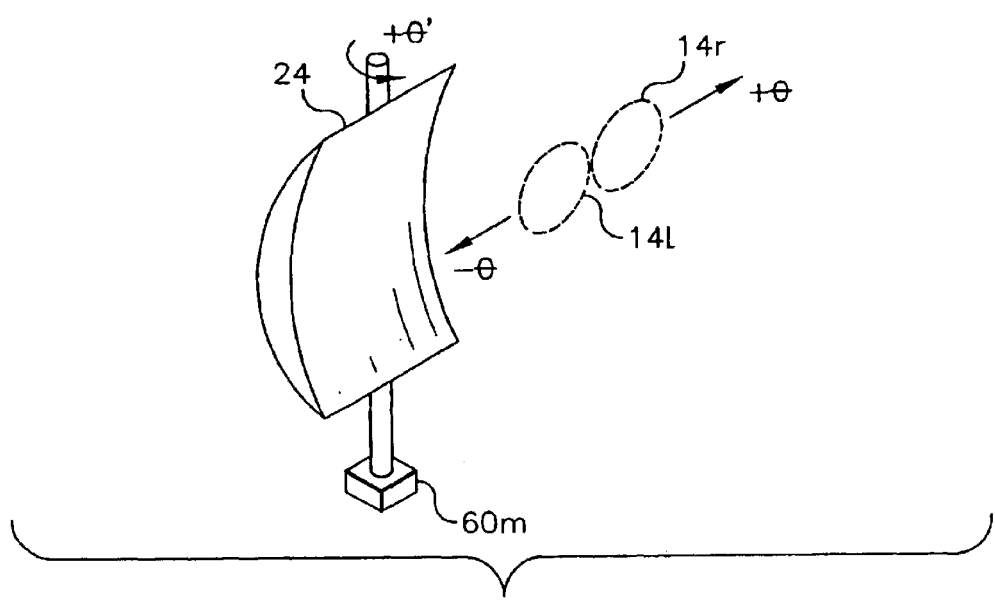
Figure 6C:
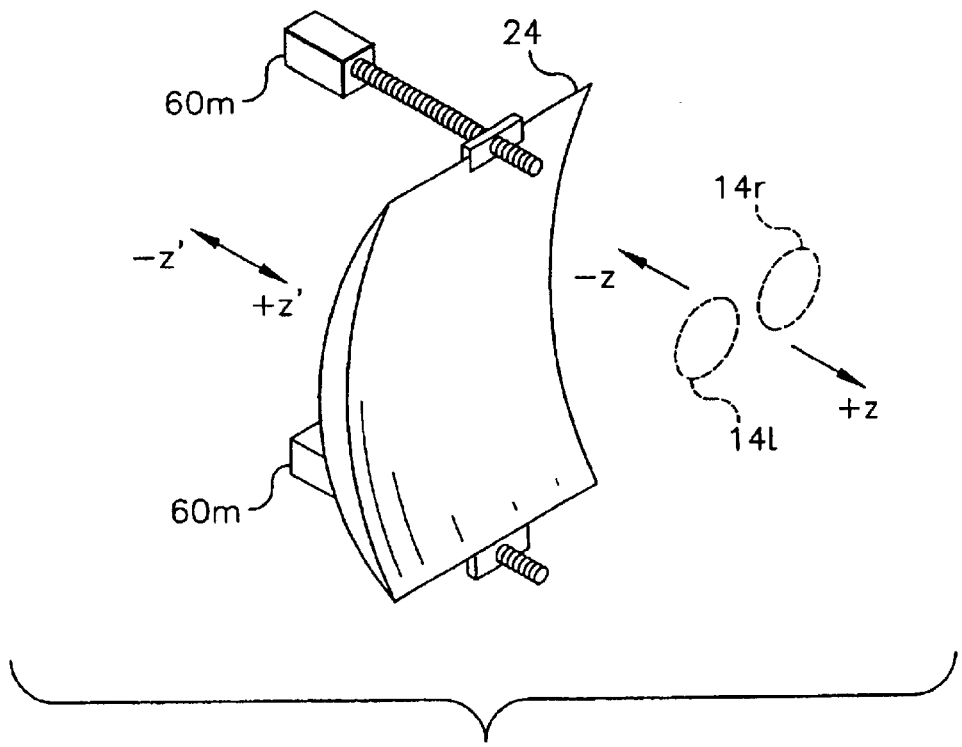

As one alternative method for adjustment of pupil 14 positioning, a tilt angle of curved mirror 24 can be changed. For this purpose, mirror positioning apparatus 60*m* may comprise one or more servo motors, one or more leadscrew mechanisms, hydraulic actuators, springs, pulleys, or other motive mechanisms as mechanical actuators, for example. FIG. 6*a* shows a coordinate mapping arrangement used in the operation of control feedback loop 100 that allows compensation by tilting curved mirror 24 about a horizontal axis. FIG. 6*b* shows a coordinate mapping arrangement for tilting curved mirror 24 about a vertical axis. FIG. 6*c* shows a coordinate mapping arrangement for moving curved mirror 24 backwards or forwards in a horizontal direction.

In considering the solutions offered in FIGS. 6*a* through 6*c*, it should be noted that curved mirror 24 can be rotated only over limited distances. However, this method allows some flexibility for adjustment of viewing pupil 14 positions, particularly where only minor adjustments are needed, such as would be the case with reasonable movement of observer 12 seated in a viewing environment. Moreover, the movement of curved mirror 24 could be used in conjunction with movement of ball lens assemblies 30 as was described with reference to FIG. 5 above.

Figure 7A:
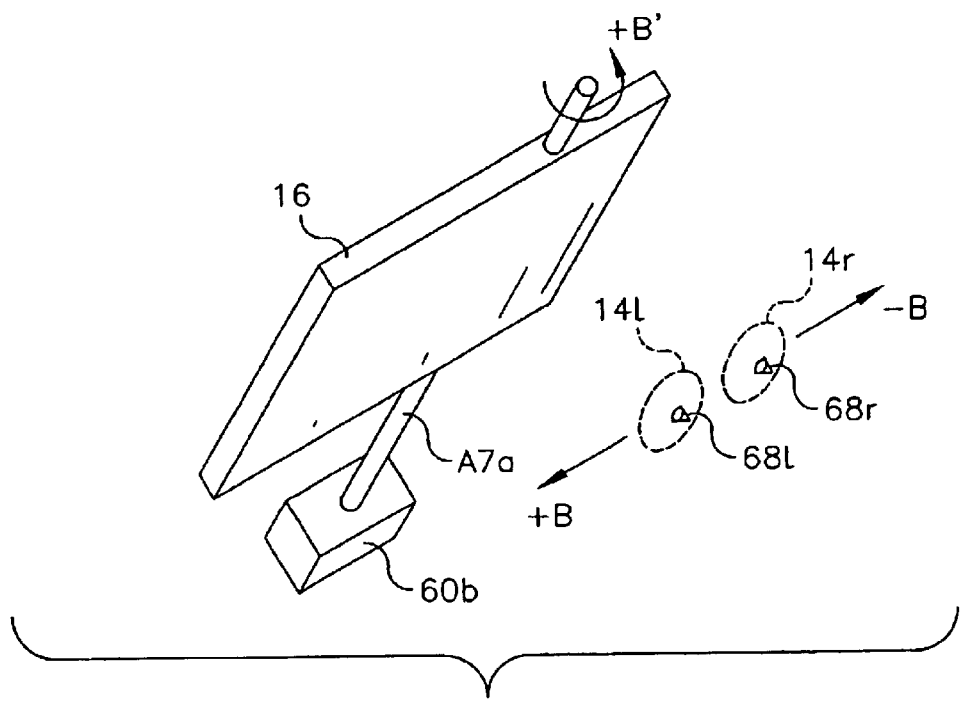
FIGS. 7a, 7b, and 7c are perspective views showing how movement of the beamsplitter, along different alternative axes, can be used to compensate for an observer's head movement with respect to the apparatus.
Figure 7B:
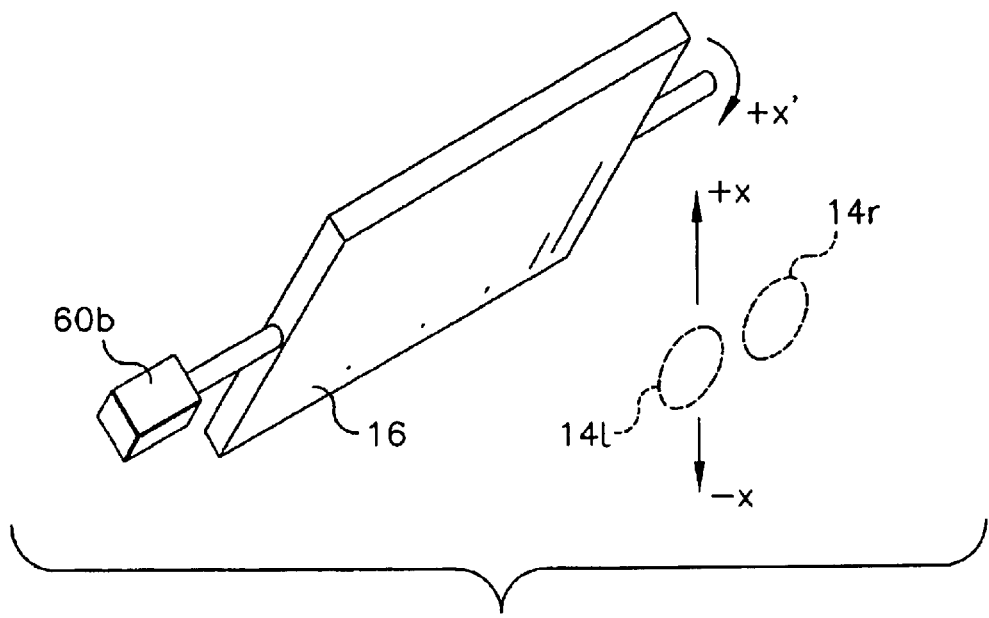
Figure 7C:
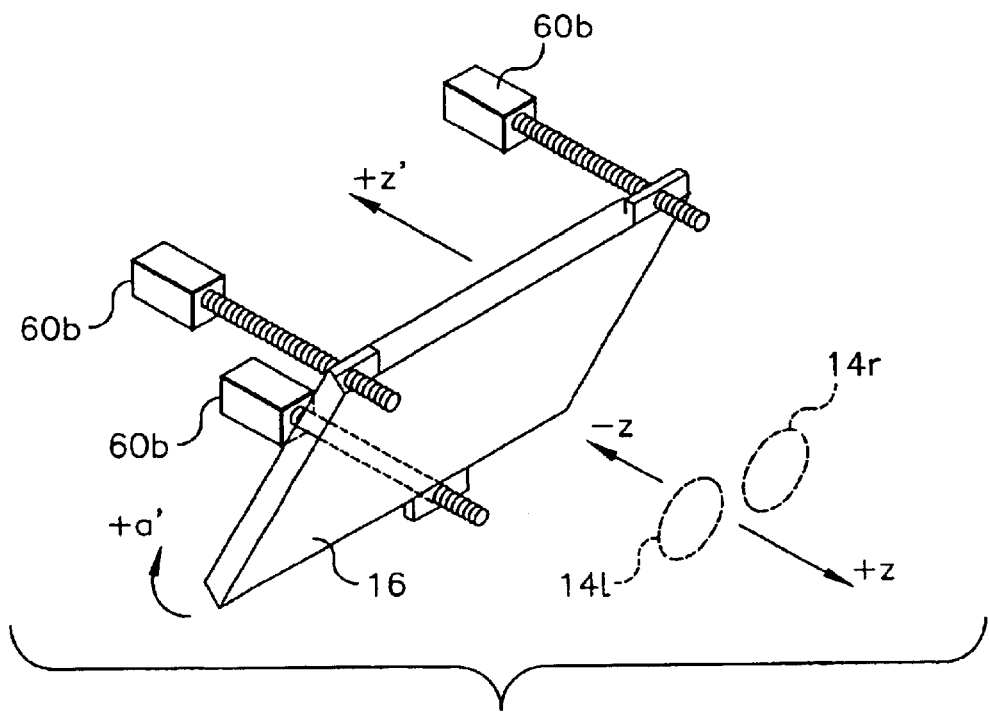

As yet another alternative method for adjustment of pupil 14 positioning, an angular position of beamsplitter 16 can be changed. For this purpose, beamsplitter positioning apparatus 60*b* could comprise a servo motor, a leadscrew, a hydraulic actuator, springs, pulleys, and other mechanical actuators. FIGS. 7*a*, 7*b*, and 7*c* show various coordinate mapping relationships for the operation of control feedback loop 100 in order to adjust the position of each viewing pupil 14*l*/14*r* based on detected change in position of each human eye pupil 68*l*/68*r* of observer 12 when using beamsplitter positioning apparatus 60*b*. FIGS. 7*a* and 7*b* show coordinate mapping arrangements used in the operation of control feedback loop 100 that allow compensation by tilting beamsplitter 16 about orthogonal axes within the plane containing beamsplitter 16 itself. FIG. 7*c* shows a coordinate mapping arrangement for moving beamsplitter 16 forward or backward with respect to observer 12, along with the necessary motion to tilt beamsplitter 16 at the same time in order to effect z-axis changes. It can be noted that a three-point support mechanism, as represented in FIG. 7*c*, could alternately be employed to effect any of the movement shown in FIGS. 7*a* and 7*b*.

In considering the solutions offered in FIGS. 7*a*, 7*b*, and 7*c*, it should be noted that there are practical limits to angular movement of beamsplitter 16. Excessive angular adjustment of beamsplitter 16 could result in off-axis imaging, introducing image aberrations and distortion. However, this method allows some flexibility for adjustment of viewing pupil 14 positions, particularly where only minor adjustments are needed, such as would be the case with reasonable movement of observer 12 seated in a viewing environment. Moreover, the movement of beamsplitter 16 could be used in conjunction with movement of curved mirror 24 as was described with reference to FIGS. 6*a*–6*c* above, and/or with movement of ball lens assemblies 30 as was described with reference to FIG. 5 above. It would be possible to coordinate movement of any combination of components within viewing pupil forming apparatus 36 in order to effect movement of pupil 14, following the coordinate mappings provided in FIGS. 5, 6*a*–6*c*, and 7*a*–7*c*.

Figure 8:
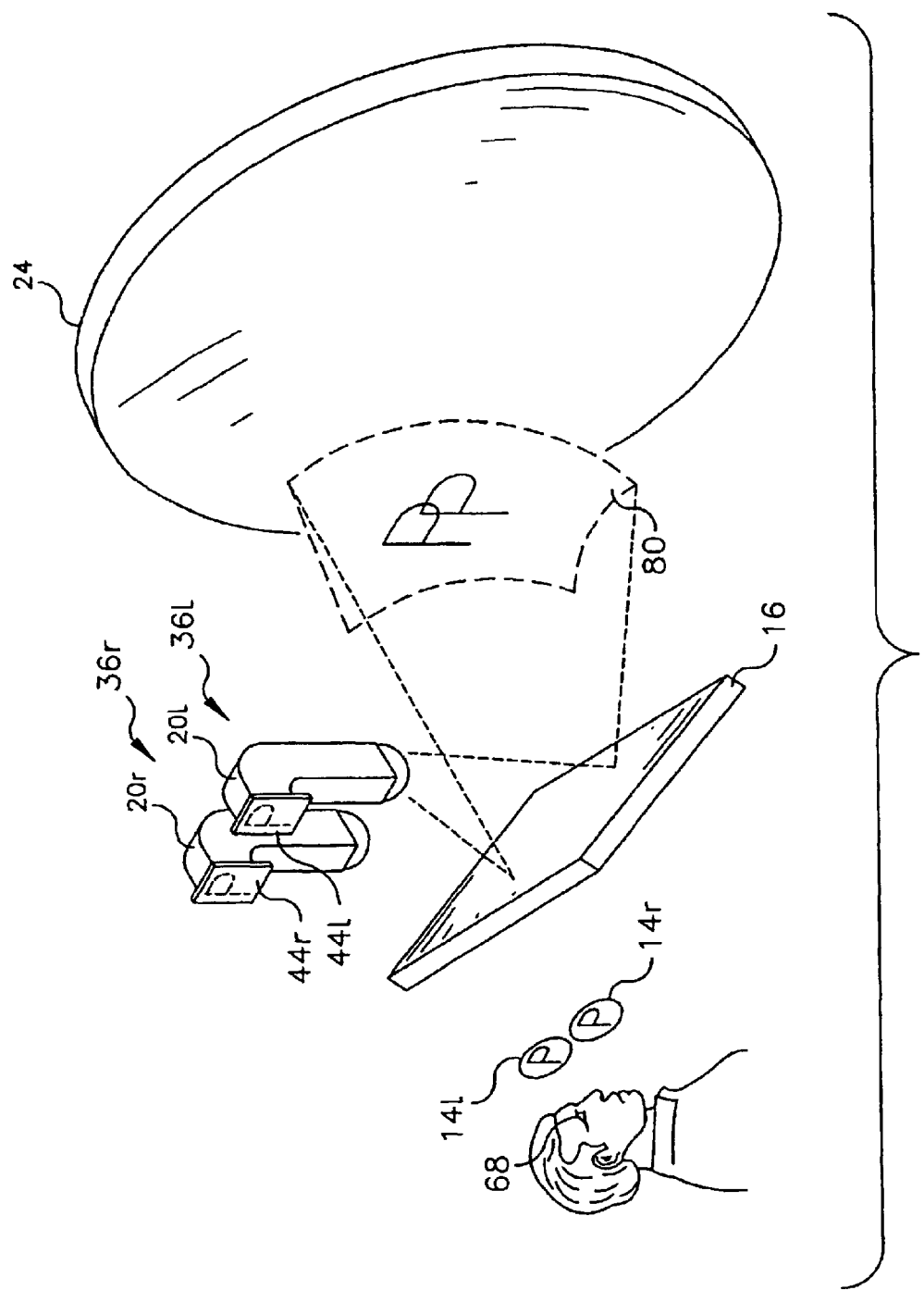
FIG. 8 is a perspective view showing the orientation of images at different locations within the adaptive autostereoscopic display system.

Referring back to FIG. 7a, tilting beamsplitter 16 about an axis A7a as shown shifts pupil 14 positions along an arc, rather than along a straight axis. In addition, this movement also changes the viewing relationship of observer 12 with respect to image content. This means that, in order to preserve realistic stereoscopic image content, viewing pupil forming apparatus 36 must also compensate when beamsplitter 16 is rotated in this fashion. In order to illustrate the nature of this compensation, FIG. 8 shows the orientation of images as they are projected within adaptive autostereoscopic display system 10. In FIG. 8, the pattern of letter "P" is used to show image orientation. Spatial light modulators 44 provide the image to left-eye and right-eye projection apparatus 20l/20r. From the perspective shown in FIG. 8, the image itself is on the unseen surface of reflective spatial light modulator 44; hence, this original image is represented by the letter "P" written in dotted lines. A real image, projected by ball lens assembly 30 toward beamsplitter 16, is formed as curved image 80. Curved mirror 24 provides the virtual image of curved image 80 that is perceived by observer 12 at pupils 14.

Figure 9A:
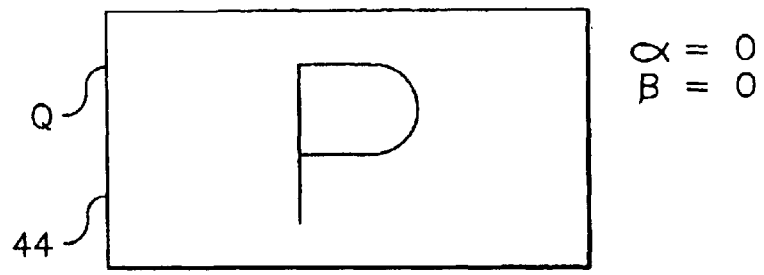
FIGS. 9a, 9b, and 9c are plane views showing how a spatial light modulator in the imaging optics path can be moved to adjust displayed image scene content based on a corresponding change in the observer's head movement and view relationship when adjusting beamsplitter orientation.
Figure 9B:
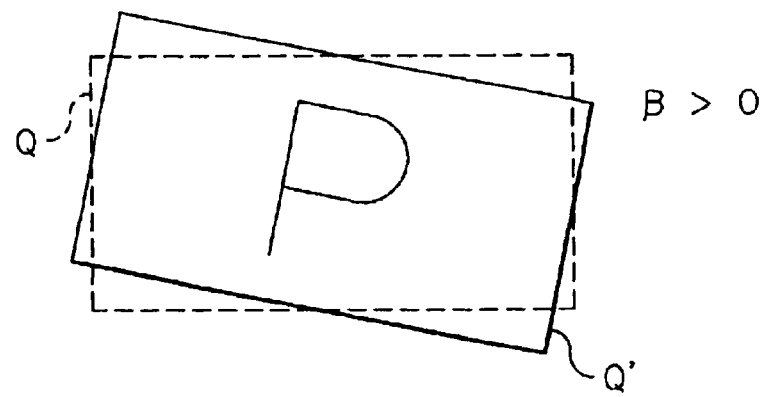

FIG. 9a shows the relative position of the image at baseline position Q when beamsplitter 16 has not been rotated. This baseline position Q is the correct position for image placement with α and β positions both at zero, using the coordinate conventions of FIGS. 7a, 7b, and 7c. Returning to consideration of pupil 14 adjustment in FIG. 7a, rotation of beamsplitter 16 about axis A7a results in tilting the perceived image. To compensate, the tilt angle of spatial light modulator 44 for projection apparatus 20 must be changed accordingly from baseline position Q to adjusted position Q' when β>0, as is shown in FIG. 9b. The opposite rotation would be used when β<0.

Figure 9C:
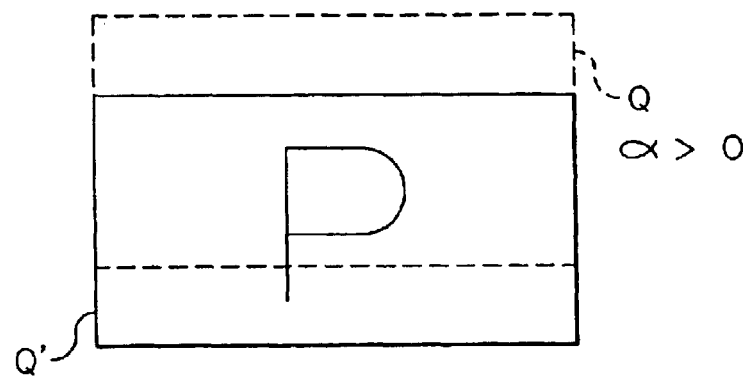

Returning to consideration of pupil 14 adjustment in FIG. 7b, rotation of beamsplitter 16 about the indicated axis would result in raising the perceived image. To compensate, the elevation of spatial light modulator 44 for projection apparatus 20 must be changed accordingly from baseline position Q to adjusted position Q' when α>0, as is shown in FIG. 9c. The opposite movement would be used when a α<0 in FIG. 7b.

The adjustment of the image from spatial light modulator 44 that accomplishes the necessary repositioning shown in FIGS. 9b and 9c could be accomplished in a number of ways. One solution would be to adjust image data, so that spatial light modulators 44 remain stationary. Or, spatial light modulators 44 could be moved using small mechanical actuator devices such as motors to effect the necessary adjustment. It might also be preferred to shift the position of components of projection apparatus 20 to effect the necessary image adjustment.

It must also be noted that image generator 40, under command from control logic processor 50, can also control image scene content in response to observer 12 head movement. This is in addition to compensation controlled by control logic processor 50 that optimizes the optical path of system 10 by controlling the translation apparatus 60l/60r and positioning apparatus 60b/60m within viewing pupil forming apparatus 36 as noted above. Image scene content would be modified, for example, to provide realistic vertical parallax information when the head of observer 12 is tilted. In this way, an axis intersecting left human eye pupil 68l and right human eye pupil 68r is effectively matched not only by positioning viewing pupils 14l and 14r correspondingly, but also by changing scene content to accommodate for head tilt.

Coarse Positioning Compensation Using Chair Servo Mechanism 66

Referring back to the block diagram of FIG. 4, controlled outputs from control logic processor 50 within control feedback loop 100 may also include a motion platform 102, chair servo mechanism 66, fan 106, or other output device. For positioning of observer 12, control logic processor 50 can control chair servo mechanism 66 or motion platform 102. In the preferred embodiment, chair servo mechanism 66 is used to obtain a "coarse" positioning of observer 12 when first seated at system 10. Then, during operation of display system 10, translation apparatus 60l, 60r, and positioning apparatus 60b, and 60m can be used, singly or in any combination, to dynamically adjust for position changes. Once observer 12 is comfortably seated, changes in head position during operation are assumed to be relatively small. Therefore, the preferred embodiment attempts to adapt to small changes using translation apparatus 60l, 60r, and positioning apparatus 60b, and 60m, since this movement is more efficiently and accurately achieved when compared with movement of chair 32.

Adjustment for Interocular Distance Differences

Figure 10A:
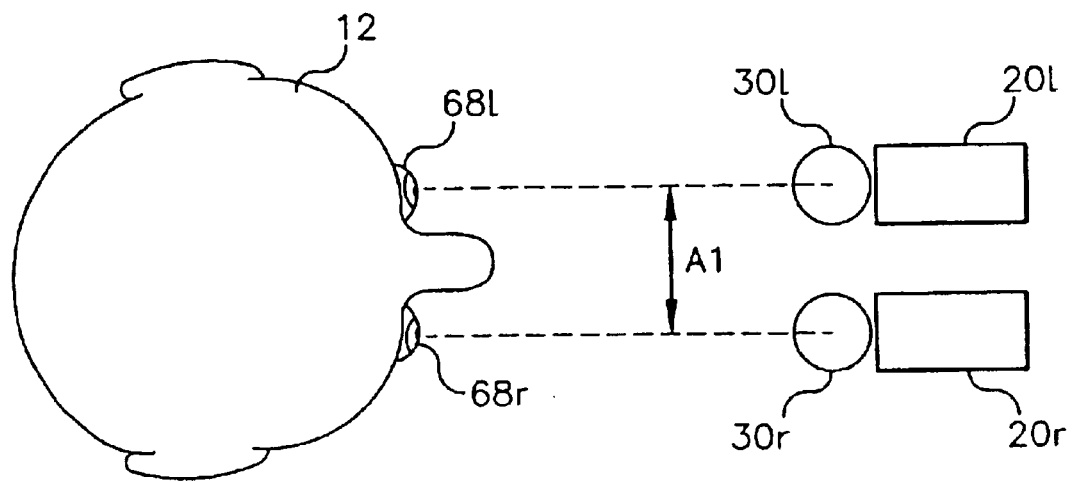
FIGS. 10a and 10b are schematic views showing system compensation for difference in interocular distance.
Figure 10B:
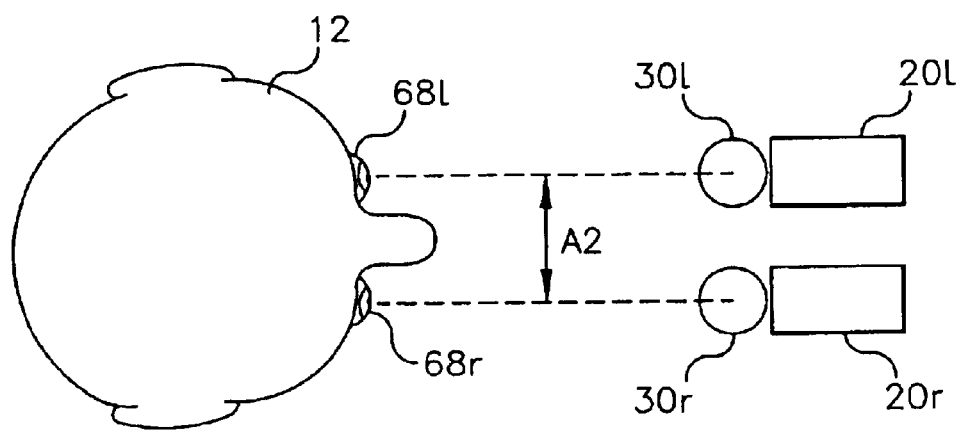

It must also be noted that there are advantages not only in adjusting the locations of viewing pupils 14l and 14r within the x, y, and z axes shown in FIG. 5, but also in compensating for variation in interocular distance for observer 12. Referring to FIG. 10a, there is shown an interocular distance A1 for an adult observer 12. FIG. 10b represents an interocular distance A2 for a child. As FIGS. 10a and 10b suggest, the use of ball lens assembly 30 optics within projection apparatus 20 allows close spacing of left-eye and right-eye projection apparatus 20l and 20r. (Note also that FIGS. 10a and 10b are representative of what happens in an optical sense only; in the actual adaptive autostereoscopic display system 10 of the preferred embodiment, the relative positions of left-eye and right-eye projection apparatus 20l and 20r are reversed, due to the use of curved mirror imaging. Refer to the optics path shown in FIG. 3 for relative positions of left-eye and right-eye projection apparatus 20l and 20r.)

In this way, the novel apparatus of the present invention is able to compensate not only for eye movement, but also for interocular distance differences between observers 12.

It is important to note that movement of observer 12 in the z direction, as labeled in FIGS. 5, 6c, and 7c, also results in small changes in magnification of viewing pupil 14. For this reason, it is preferred to scale the actual x and y motion compensation for observer 12, as labeled in FIG. 5, based on instantaneous pupil magnification, which is a function of z. In terms of the response of projection translation apparatus 60 in executing the movement illustrated in FIG. 5, this means scaling any x' and y' translation of ball lens assembly 30 as a function of the z' position. With respect to interocular distance A1/A2, as shown in FIGS. 10a and 10b, any change in z' position also impacts the distance between the centers of left and right viewing pupils 14l and 14r. To compensate, it is therefore desirable to adjust the distance between left and right ball lens assemblies 30l and 30r such that the distance between the centers of left and right viewing pupils 14l and 14r corresponds instantaneously to detected interocular distance A1/A2 of observer 12.

Other Sensory Input

In addition to detecting the position of human eye pupil 68 using cameras 54, adaptive autostereoscopic display system 10 is also capable of obtaining feedback data from observer 12 using other types of observer feedback sensors 52. For head tracking, for example, the use of reflected infrared light, as is disclosed in European Patent Application 0 350 957, can have cost and performance advantages. Gaze-tracking technologies can be used to obtain feedback data, either for command entry from observer 12 or for adapting to observer 12 interest.

Inputs from observer 12 may include manual feedback controls 104 such as a mouse, trackball, force ball, joystick, or other manipulable device. Originally used for controlling cursor positioning in two dimensions (that is, the familiar Cartesian x and y dimensions), devices of this type are increasingly used for control with added dimensions and translations (for example, adding z dimension and rotation) and have been adapted for haptic interactive response, with varying degrees of responsiveness and resistance to movement, for example, based on context. For example, hardware enhancements, including extra buttons, wheels, and controls, can add z dimension to the conventional x,y cursor dimension and can also add rotation along the three x, y, and z axes. As an example of one such device, the 6D controller from Global Devices (www.globaldevices.com) provides a ball combined with a joystick device. The ball can be pulled or twisted to provide additional input data in addition to the standard joystick left/right and forward/back functions. Another example is the Magellan/SpaceMouse Classic from LogiCad 3D Inc., Union City, Calif., which is used to input information such as x, y, and z coordinates, pitch, roll, and yaw movement.

Another exemplary virtual reality input device is the instrumented glove. One such device is the VPL DataGlove from Greenleaf Medical Systems, Palo Alto, Calif. Another device used for sensing finger bend and wrist orientation is the Wireless DataGlove™ from General Reality Company, Los Angeles, Calif.

Yet another input device is a VR puck, such as the CyberPuck VRC, available from Interactive Imaging Systems, Inc., Rochester, N.Y. This device senses pitch, roll, and other input in addition to standard joystick input functions.

Other input devices suited to this system include the following:
  (a) speech recognition systems, available from companies such as Verbex Voice Systems or VoiceReport from Kurzweil Applied Intelligence.
  (b) bodily orientation tracking, using optical tracking or using a plurality of sensors in combination, as is disclosed in U.S. Pat. No. 6,148,280 (Kramer).

A wide range of sensors can be used in order to obtain feedback information from observer 12. This can include sensors that collect physiological or behavioral response data, sensors that obtain intentional command or instruction input, and other types of sensors. Observer feedback sensors 52 can be mounted on or built into movable chair 32, on housing 58, or on some other part of adaptive autostereoscopic display system 10. Alternately, one or more observer feedback sensors 52 might be attached to, worn by, or carried by observer 12, such as the retroreflective marker disclosed for head-tracking in U.S. Pat. No. 5,712,732 (Street). A head-tracking device, such as U.S. Pat. No. 6,162,191 (Foxlin) discloses, could also be employed.

Other Sensory Stimulation

In addition to the stereoscopic display and optional audio stimuli described above for the preferred embodiment, other types of stimuli for observer 12 may include the following:
  (a) movement, provided by motion platform 102. Motion platforms, such as those provided for applications such as simulation and entertainment, could be employed as part of autostereoscopic display system 10. One example of a motion platform is the Series 6DOF2000E Electric Motion Platform from Moog Inc., East Aurora, N.Y.
  (b) tactile output, provided by devices such as the Exos TouchMaster, for example.
  (c) low-frequency audio output. This includes vibration transducer devices such as the Bass Shaker from Sensaphonics Hearing Conservation, Chicago, Ill. Such devices can be mounted on adjustable chair 32, for example.
  (d) air movement, such as using fans. Heated or cooled air could be provided.
  (e) olfactory stimuli, introducing odors intended to enhance display image content. Examples of apparatus providing olfactory stimuli include devices from DigiScents, formerly in Oakland, Calif.

These sensory stimuli can be made to vary with display image content as well as with detected feedback information on observer size (adults vs. children), activity level (possibly detecting anxiety or boredom), or other obtained or inferred information.

Adaptive autostereoscopic display system 10 can be utilized with either moving pictures or with still pictures or slides or pictures of stationary objects, for one or both left-eye and right-eye images.

The preferred embodiment of the present invention provides an exceptionally wide field of view for stereoscoping imaging in excess of the 90-degree range, with viewing pupil 14 size near 20 mm. Moreover, ball lens assembly 30 provides excellent off-axis performance and allows a wider field of view, possibly up to 180 degrees. This provides an enhanced viewing experience for observer 12, without requiring that headset, goggles, or other device be worn.

Optional and Alternate Embodiments

It can be readily appreciated that there are a number of possible variations permissible within the scope of the present invention. For example, while there are advantages to movable chair 32, adaptive autostereoscopic display system 10 could operate with observer 12 standing or seated in an ordinary chair that is not controlled by system 10. Movable chair 32 provides a significant advantage in providing a "coarse" positioning of observer 12 that allows optimization of response from projection translation apparatus 60.

Figure 11:
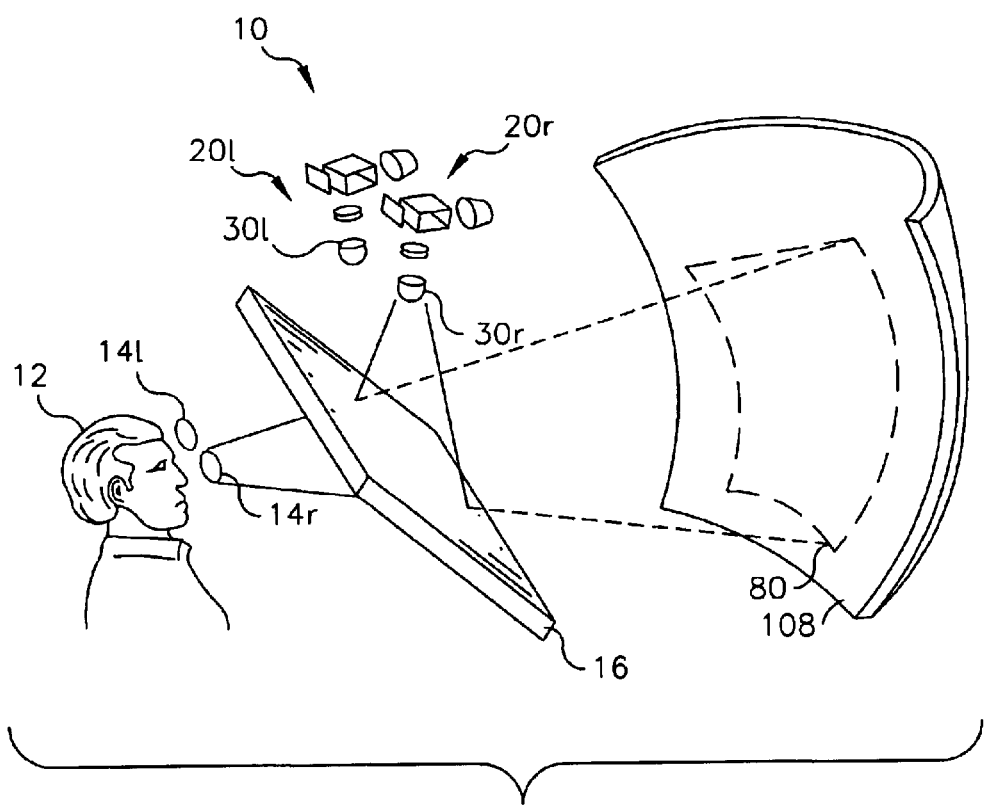
FIG. 11 is a perspective view showing an arrangement of components using ball lens optics with a retroreflective screen.

While the preferred embodiment of adaptive autostereoscopic display system 10 displays a virtual image to observer 12, alternate optical arrangements are possible. For example, autostereoscopic image delivery system 18 could employ a retroreflective or substantially retroreflective screen surface instead of the arrangement of the preferred embodiment using curved mirror 24 and beamsplitter 16. Referring to FIG. 11, there is shown an embodiment of adaptive autostereoscopic display system 10 using a retroreflective surface 108. For the system shown in FIG. 11, observer 12 views, at viewing pupils 14l and 14r, an image that is projected onto retroreflective surface 108. In comparison with the configuration of FIG. 3a that uses curved mirror 24 to provide a virtual image, the configuration of FIG. 11 provides a real image. Using projection apparatus 20 of the preferred embodiment, adaptive autostereoscopic display system 10 projects curved image 80 onto retroreflective surface 108.

In a preferred arrangement of the alternate embodiment using retroreflective surface 108, a curvature is used for retroreflective surface 108, as is shown in FIG. 11. A spherical curvature is optimal for this application, providing the best focus since it is therefore adapted to the surface shape of ball lens assembly 30. This shape also helps to minimize intensity falloff of retroreflective surface 108 with angle.

The optical paths through system 10 when using retroreflective surface 108 (FIG. 11) differ from the optical paths of system 10 when using curved mirror 24 (FIG. 3). Optical paths for left and right viewing pupils 14l/14r do not cross each other when utilizing retroreflective surface 108. The arrangement of optical components when using retroreflective surface 108 is substantially monocentric.

It must be noted that the arrangement of FIG. 11 also allows for movement of beamsplitter 16 and/or left and right ball lens assemblies 30l/30r in order to adjust the spatial position of left and right viewing pupils 14l/14r. Using the coordinate mapping shown in FIG. 5 for the arrangement of FIG. 11, movement of observer 12 in the +x direction would require moving ball lens assemblies 30l/30r in the −x' direction; movement of observer 12 in the −z direction, towards beamsplitter 16, would require moving ball lens assemblies 30l/30r in the +z' direction; movement of observer 12 in the +y direction would require moving ball lens assemblies 30l/30r in the −y' direction.

Figure 12:
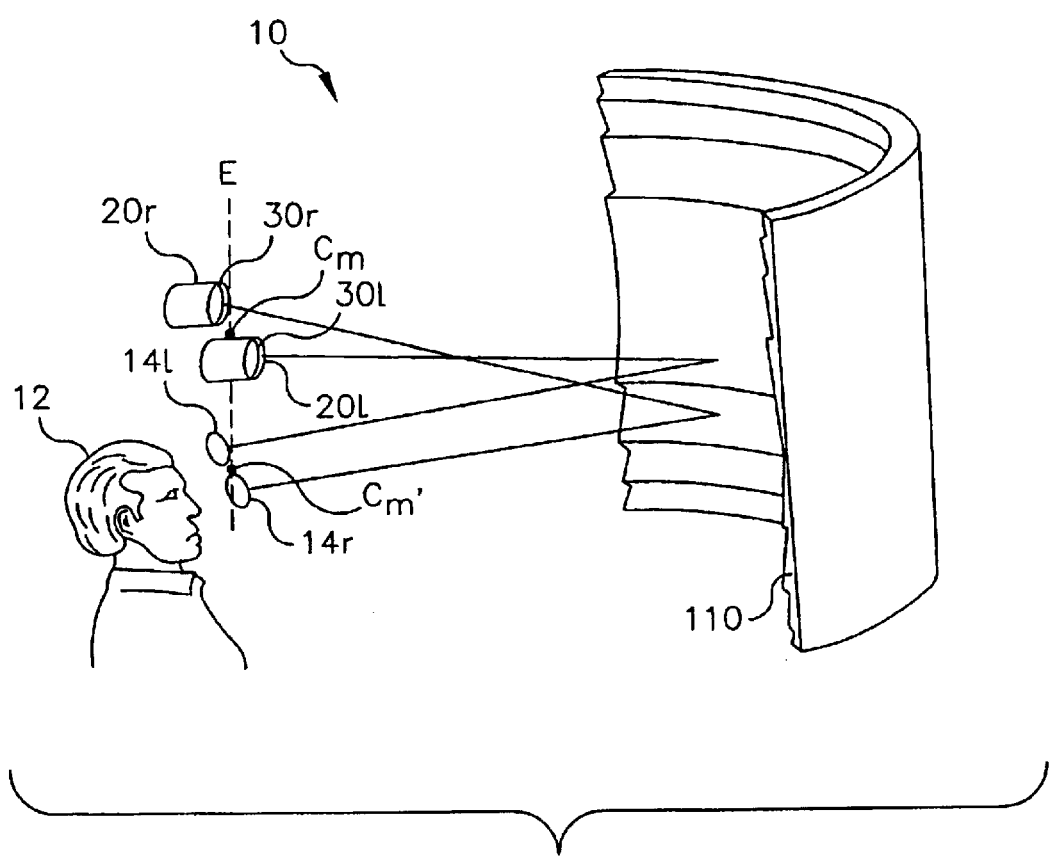
FIG. 12 is a perspective view showing an arrangement of components using a fresnel mirror as part of the projection apparatus; and, FIG. 13 is a perspective view showing an alternate arrangement of components using a curved mirror and nearly on-axis imaging.

Referring to FIG. 12, another alternate embodiment of adaptive autostereoscopic display system 10 utilizes a cylindrically curved, reflective fresnel mirror 110 in place of curved mirror 24. The arrangement of components in FIG. 12 is monocentric with respect to an axis E, which is defined at one end by a center of curvature point $C_m$ that is midway between left ball lens assembly 30l and right ball lens assembly 30r and at the other end by a center of curvature point $C_m'$ that is midway between viewing pupils 14l and 14r. Reflective fresnel mirror 110 effectively has power in both directions. Power in one direction is from the fresnel structure itself; power in the orthogonal direction results from curvature of reflective fresnel mirror 110. Reflective fresnel mirror 110 can be, for example, a planar element fabricated on a flexible substrate, similar to fresnel optical components manufactured by Fresnel Optics, Rochester, N.Y. Fresnel mirror 110 would image the pupils of ball lens assemblies 30l/30r onto viewing pupils 14l/14r without requiring a beamsplitter 16. Projection apparatus 20 would be optimized to accommodate fresnel mirror 110 performance characteristics.

Figure 13:
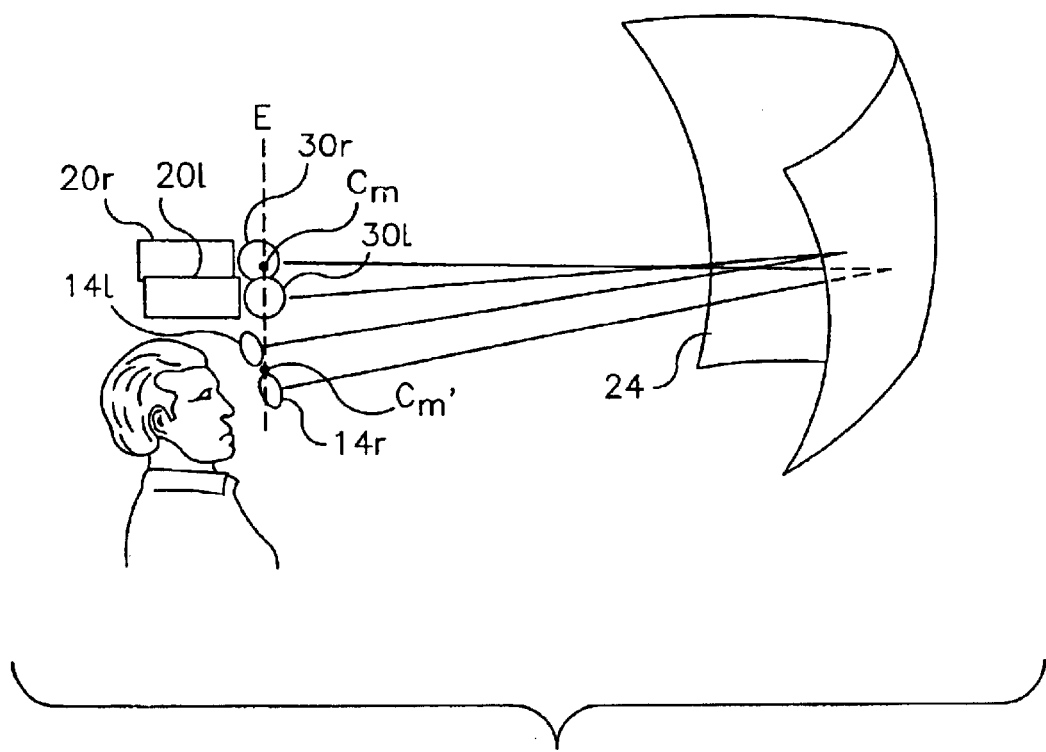

Referring to FIG. 13, there is shown yet another alternative embodiment in which curved mirror 24 is fabricated to have a curvature with a shape that is based on whether or not projection is near-axis or off-axis. For near-axis projection, within approximately 6 degrees of the curved mirror 24 axis, a spherical shape would be suitable for curved mirror 24. For off-axis projection, in excess of approximately 6 degrees from the curved mirror 24 axis, curved mirror 24 would be substantially toroidal, such as in the shape of an oblate spheroid. The arrangement of FIG. 13 requires fewer components, not needing any beamsplitter as with other embodiments. Center of curvature point $C_m'$ is chosen to be midway between viewing pupils 14l and 14r. Center of curvature point $C_m$ in FIG. 13 is midway between center points of ball lens assemblies 30l/30r. An aspherical design could be toroidal and monocentric with respect to axis E which passes through points $C_m$ and $C_m'$. In cross-section, curved mirror 24 fabricated in this manner could be elliptical, with points $C_m$ and $C_m'$ serving as foci of the ellipse.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, for viewing pupil 14 positioning as is indicated above, viewing pupil forming apparatus 36 could simply comprise a movable projection apparatus 20, or a movable beamsplitter 16, or a movable curved mirror 24, or any combination of two of these devices, or all three of these devices within the scope of the present invention. Image generator 40, controlling spatial light modulator 44 in the preferred embodiment, could alternately control any of a number of types of devices to provide an image as part of viewing pupil forming apparatus 36, including a cathode ray tube (CRT), a laser, or an emissive display device such as an Organic Light Emitting Diode (OLED), available from eMagin Corporation, Hopewell Junction, N.Y., for example.

Thus, what is provided is an autostereoscopic display, providing a very wide field of view and large viewing pupils, capable of adapting to feedback data about an observer in order to adjust the position of the viewing pupils.

Parts List

10. Adaptive autostereoscopic display system
12. Observer
14. Viewing pupil
14l. Left viewing pupil
14r. Right viewing pupil
16. Beamsplitter
18. Autostereoscopic image delivery system
20. Projection apparatus
20l. Left-eye projection apparatus
20r. Right-eye projection apparatus
22. Front focal surface
24. Curved mirror
30. Ball lens assembly
30l. left ball lens assembly
30r. Right ball lens assembly
32. Adjustable chair
34. Light source
36. Viewing pupil forming apparatus
36l. Left viewing pupil forming apparatus
36r. Right viewing pupil forming apparatus
40. Image generator
42. Image source
44. Spatial light modulator
50. Control logic processor
52. Observer feedback sensor
54. Camera
58. Housing
60. Projection translation apparatus
60l. Left-eye projection translation apparatus
60r. Right-eye projection translation apparatus
60b. Beamsplitter positioning apparatus
60m. Mirror positioning apparatus
62. Speaker system
64. Speaker
66. Chair servo mechanism
68. Human eye pupil
68l. Left human eye pupil
68r. Right human eye pupil
70. Audio source
80. Curved image
80l. Left curved image
80r. Right curved image
100. Control feedback loop
102. Motion platform
104. Manual feedback control
106. Fan
108. Retroreflective surface
110. Reflective fresnel mirror

What is claimed is:

1. An autostereoscopic image display apparatus for modifying the spatial position of a left eye viewing pupil and a right eye viewing pupil in response to feedback data about an observer, said display apparatus comprising:
   (a) an adaptive autostereoscopic image delivery system comprising:
      (1) an image generator for generating, from an image source, a left eye image and a right eye image;
      (2) a control logic processor for accepting feedback data about said observer and of providing a command in response to said feedback data;
      (3) a left viewing pupil forming apparatus for providing said left eye image, as a virtual image, to said left viewing pupil for viewing by said observer;
      (4) a right viewing pupil forming apparatus for providing said right eye image, as a virtual image, to said right viewing pupil for viewing by said observer,
   wherein said left viewing pupil forming apparatus and said right viewing pupil forming apparatus adjust the position of the left viewing pupil and right viewing pupil respectively, based on said command from said control logic processor;
   (b) at least one observer feedback sensor for providing said feedback data to said control logic processor.

2. The image display apparatus of claim 1 wherein said image source is film.

3. The image display apparatus of claim 1 wherein said image source is video.

4. The image display apparatus of claim 1 wherein said image source comprises a computer.

5. The image display apparatus of claim 1 wherein said image source comprises a camera.

6. The image display apparatus of claim 1 wherein said image source comprises a storage medium.

7. The image display apparatus of claim 1 wherein said left eye image is a still image.

8. The image display apparatus of claim 1 wherein said left eye image is a motion image.

9. The image display apparatus of claim 1 wherein said left viewing pupil forming apparatus comprises a ball lens.

10. The image display apparatus of claim 1 wherein said right viewing pupil forming apparatus comprises a ball lens.

11. The image display apparatus of claim 1 wherein said at least one observer feedback sensor comprises a camera.

12. The image display apparatus of claim 1 wherein said at least one observer feedback sensor comprises a photosensor.

13. The image display apparatus of claim 1 wherein said at least one observer feedback sensor comprises a head tracking apparatus.

14. The image display apparatus of claim 1 wherein said at least one observer feedback sensor further comprises a gaze tracking apparatus.

15. The image display apparatus of claim 1 wherein said at least one observer feedback sensor is coupled to said observer.

16. The image display apparatus of claim 1 wherein said feedback data comprises an interocular distance obtained from said observer.

17. The image display apparatus of claim 1 wherein said feedback data indicates a gesture made by said observer.

18. The image display apparatus of claim 1 wherein said feedback data comprises a distance dimension.

19. The image display apparatus of claim 1 further comprising an audio output apparatus for providing sound.

20. The image display apparatus of claim 1 further comprising a chair for seating said observer.

21. The image display apparatus of claim 20 wherein said observer feedback sensor is coupled to said chair.

22. The image display apparatus of claim 20 wherein said chair is capable of being moved in response to said command from said control logic processor.

23. The image display apparatus of claim 20 further comprising a vibration transducer coupled to said chair.

24. The image display apparatus of claim 1 further comprising a movable platform, said movable platform capable of being moved in response to said command from said control logic processor.

25. The image display apparatus of claim 1 further comprising a tactile output apparatus.

26. The image display apparatus of claim 25 wherein said tactile output apparatus directs an air flow to said observer.

27. The image display apparatus of claim 26 wherein said tactile output apparatus controls temperature of said air flow.

28. The image display apparatus of claim 25 wherein said tactile output apparatus modulates a surface touched by said operator.

29. The image display apparatus of claim 1 further comprising an olfactory output apparatus for emitting an odor perceptible to said observer.

30. The image display apparatus of claim 1 further comprising a manipulable device for interaction with said operator.

31. The image display apparatus of claim 1 wherein said image generator is capable of modifying said left eye image and said right eye image based on said command from said control logic processor.

32. The image display apparatus of claim 31 wherein said image generator modifies said left eye image and said right eye image in order to adjust the stereoscopic viewing relationship between said left eye image and said right eye image for displaying correct parallax information as the observer moves.

33. The image display apparatus of claim 31 wherein said command compensates for head tilt by the observer.

34. The image display apparatus of claim 1 wherein said left viewing pupil forming apparatus comprises a beamsplitter.

35. The image display apparatus of claim 34 further comprising a mechanical actuator for adjusting the orientation of said beamsplitter.

36. The image display apparatus of claim 1 wherein said right viewing pupil forming apparatus comprises a beamsplitter.

37. The image display apparatus of claim 36 further comprising a mechanical actuator for adjusting the orientation of said beamsplitter.

38. The image display apparatus of claim 1 wherein said left viewing pupil forming apparatus comprises a curved mirror.

39. The image display apparatus of claim 38 further comprising a mechanical actuator for adjusting the orientation of said curved mirror.

40. The image display apparatus of claim 38 wherein said curved mirror comprises a plurality of mirror segments.

41. The image display apparatus of claim 38 wherein said curved mirror is a fresnel mirror.

42. The image display apparatus of claim 38 wherein said curved mirror is spherical.

43. The image display apparatus of claim 38 wherein said curved mirror is an oblate spheroid.

44. The image display apparatus of claim 1 wherein said right viewing pupil forming apparatus comprises a curved mirror.

45. The image display apparatus of claim 44 further comprising a mechanical actuator for adjusting the orientation of said curved mirror.

46. The image display apparatus of claim 44 wherein said curved mirror comprises a plurality of mirror segments.

47. The image display apparatus of claim 44 wherein said curved mirror is a fresnel mirror.

48. The image display apparatus of claim 44 wherein said curved mirror is spherical.

49. The image display apparatus of claim 44 wherein said curved mirror is an oblate spheroid.

50. The image display apparatus of claim 1 wherein said left viewing pupil forming apparatus comprises a spatial light modulator.

51. The image display apparatus of claim 50 further comprising an actuator for adjusting the position of said spatial light modulator based on a command from said control logic processor.

52. The image display apparatus of claim 50 wherein said spatial light modulator comprises a liquid crystal device.

53. The image display apparatus of claim 50 wherein said spatial light modulator comprises a digital micromirror device.

54. The image display apparatus of claim 50 wherein said spatial light modulator comprises a grating light valve.

55. The image display apparatus of claim 1 wherein said right viewing pupil forming apparatus comprises a spatial light modulator.

56. The image display apparatus of claim 55 further comprising an actuator for adjusting the position of said spatial light modulator based on a command from said control logic processor.

57. The image display apparatus of claim 55 wherein said spatial light modulator comprises a liquid crystal device.

58. The image display apparatus of claim 55 wherein said spatial light modulator comprises a digital micromirror device.

59. The image display apparatus of claim 55 wherein said spatial light modulator comprises a grating light valve.

60. The image display apparatus of claim 1 wherein said left viewing pupil forming apparatus comprises a cathode-ray tube.

61. The image display apparatus of claim 1 wherein said right viewing pupil forming apparatus comprises a cathode-ray tube.

62. The image display apparatus of claim 1 wherein said left viewing pupil forming apparatus comprises a laser.

63. The image display apparatus of claim 1 wherein said right viewing pupil forming apparatus comprises a laser.

64. The image display apparatus of claim 1 wherein said left viewing pupil forming apparatus comprises an OLED.

65. The image display apparatus of claim 1 wherein said right viewing pupil forming apparatus comprises an OLED.

66. The image display apparatus of claim 1 wherein said at least one observer feedback sensor comprises a speech recognition system.

67. The image display apparatus of claim 1 wherein said at least one observer feedback sensor comprises a retroreflective marker.

68. The image display apparatus of claim 1 wherein said at least one observer feedback sensor comprises an instrumented glove.

69. The image display apparatus of claim 1 wherein said at least one observer feedback sensor obtains data from a physiological measurement.

70. An autostereoscopic image display apparatus for modifying the spatial position of a left eye viewing pupil and a right eye viewing pupil in response to feedback data about an observer, said display apparatus comprising:
  (a) an adaptive autostereoscopic image delivery system comprising:
    (1) an image generator for generating, from an image source, a left eye image and a right eye image;
    (2) a control logic processor for accepting feedback data about said observer and providing a command in response to said feedback data;
    (3) a curved substantially retroreflective surface for display of said left eye image and said right eye image as real images;
    (4) a left viewing pupil forming apparatus comprising a left ball lens for projecting said left eye image onto said curved substantially retroreflective surface for reflection to said left viewing pupil for viewing by said observer;
    (5) a right viewing pupil forming apparatus comprising a right ball lens for projecting said right eye image onto said curved substantially retroreflective surface for reflection to said right viewing pupil for viewing by said observer;
  wherein said left viewing pupil forming apparatus and said right viewing pupil forming apparatus are independently positioned in order to adjust the spatial position of said left viewing pupil and said right viewing pupil respectively, based on said command from said control logic processor;
  (b) at least one observer feedback sensor for providing said feedback data to said control logic processor.

71. The image display apparatus of claim 70 wherein said substantially retroreflective surface comprises a plurality of cube-corner reflectors.

72. The image display apparatus of claim 70 wherein said image source is film.

73. The image display apparatus of claim 70 wherein said image source is video.

74. The image display apparatus of claim 70 wherein said left viewing pupil forming apparatus comprises a cathode-ray tube.

75. The image display apparatus of claim 70 wherein said right viewing pupil forming apparatus comprises a cathode-ray tube.

76. The image display apparatus of claim 70 wherein said image source comprises a computer.

77. The image display apparatus of claim 70 wherein said image source comprises a camera.

78. The image display apparatus of claim 70 wherein said image source comprises a storage medium.

79. The image display apparatus of claim 70 wherein said left eye image is a still image.

80. The image display apparatus of claim 70 wherein said left eye image is a motion image.

81. The image display apparatus of claim 70 wherein said at least one observer feedback sensor comprises a camera.

82. The image display apparatus of claim 70 wherein said at least one observer feedback sensor comprises a photosensor.

83. The image display apparatus of claim 70 wherein said at least one observer feedback sensor comprises a head tracking apparatus.

84. The image display apparatus of claim 70 wherein said at least one observer feedback sensor further comprises a gaze tracking apparatus.

85. The image display apparatus of claim 70 wherein said at least one observer feedback sensor is coupled to said observer.

86. The image display apparatus of claim 70 wherein said feedback data comprises an interocular distance obtained from said observer.

87. The image display apparatus of claim 70 wherein said feedback data indicates a gesture made by said observer.

88. The image display apparatus of claim 70 wherein said feedback data comprises a distance dimension.

89. The image display apparatus of claim 70 further comprising an audio output apparatus for providing sound.

90. The image display apparatus of claim 70 further comprising a chair for seating said observer.

91. The image display apparatus of claim 90 wherein said observer feedback sensor is coupled to said chair.

92. The image display apparatus of claim 90 wherein said chair is capable of being moved in response to said command from said control logic processor.

93. The image display apparatus of claim 90 further comprising a vibration transducer coupled to said chair.

94. The image display apparatus of claim 70 further comprising a movable platform, said movable platform capable of being moved in response to said command from said control logic processor.

95. The image display apparatus of claim 70 further comprising a tactile output apparatus.

96. The image display apparatus of claim 95 wherein said tactile output apparatus directs an air flow to said observer.

97. The image display apparatus of claim 96 wherein said tactile output apparatus controls temperature of said air flow.

98. The image display apparatus of claim 94 wherein said tactile output apparatus modulates a surface touched by said operator.

99. The image display apparatus of claim 70 further comprising an olfactory output apparatus for emitting an odor perceptible to said observer.

100. The image display apparatus of claim 70 further comprising a manipulable device for interaction with said operator.

101. The image display apparatus of claim 70 wherein said image generator is capable of modifying said left eye image and said right eye image based on said command from said control logic processor.

102. The image display apparatus of claim 70 wherein said curved substantially retroreflective surface comprises a plurality of retroreflective segments.

103. The image display apparatus of claim 70 wherein said image generator modifies said left eye image and said right eye image in order to adjust the stereoscopic viewing relationship between said left eye image and said right eye image for displaying correct parallax information as the observer moves.

104. A method for modifying, in response to feedback data about an observer, the spatial position of a viewing pupil in an image display apparatus that provides a virtual autostereoscopic image the method comprising:

(a) obtaining said feedback data from at least one observer feedback sensor;

(b) generating a command from a control logic processor, conditioned by said feedback data, said command provided for obtaining an adjustment for the spatial position of said viewing pupil;

(c) controlling a movement of a viewing pupil forming apparatus in response to said command from said control logic processor, said movement achieving an optical adjustment of the spatial position of said viewing pupil.

105. The method of claim 104 wherein the step of controlling said movement of said viewing pupil forming apparatus comprises the step of moving a ball lens.

106. The method of claim 104 wherein the step of controlling said movement of said viewing pupil forming apparatus comprises the step of moving a curved mirror.

107. The method of claim 104 wherein the step of controlling said movement of a viewing pupil forming apparatus comprises the step of moving a beamsplitter.

108. The method of claim 104 further comprising the step of controlling a movement of a chair on which said observer is seated, said movement adjusting the position of an eye of said observer proximate to said viewing pupil.

109. The method of claim 104 wherein the step of controlling said movement of a viewing pupil positioning apparatus comprises the step of moving a spatial light modulator.

* * * * *

UNITED STATES PATENT AND TRADEMARK OFFICE
CERTIFICATE OF CORRECTION

PATENT NO. : 6,752,498 B2
DATED : June 22, 2004
INVENTOR(S) : Edward Covannon et al.

It is certified that error appears in the above-identified patent and that said Letters Patent is hereby corrected as shown below:

Column 15,
Line 65, replace "tilt" with -- movement --

Signed and Sealed this

Twenty-third Day of November, 2004

JON W. DUDAS
*Director of the United States Patent and Trademark Office*